United States Patent
Garvey et al.

(10) Patent No.: US 10,915,830 B2
(45) Date of Patent: Feb. 9, 2021

(54) MULTISCALE METHOD FOR PREDICTIVE ALERTING

(71) Applicant: Oracle International Corporation, Redwood Shores, CA (US)

(72) Inventors: Dustin Garvey, Exeter, NH (US); Sampanna Shahaji Salunke, Dublin, CA (US); Uri Shaft, Fremont, CA (US); Amit Ganesh, San Jose, CA (US); Sumathi Gopalakrishnan, Redwood Shores, CA (US)

(73) Assignee: Oracle International Corporation, Redwood Shores (CA)

( * ) Notice: Subject to any disclaimer, the term of this patent is extended or adjusted under 35 U.S.C. 154(b) by 848 days.

(21) Appl. No.: 15/643,179

(22) Filed: Jul. 6, 2017

(65) Prior Publication Data
US 2018/0247215 A1    Aug. 30, 2018

Related U.S. Application Data

(60) Provisional application No. 62/463,460, filed on Feb. 24, 2017.

(51) Int. Cl.
*G06N 7/00* (2006.01)
*G08B 21/18* (2006.01)
(Continued)

(52) U.S. Cl.
CPC ............. *G06N 7/005* (2013.01); *G06N 5/045* (2013.01); *G06N 20/00* (2019.01); *G08B 21/182* (2013.01)

(58) Field of Classification Search
CPC ................................ G06F 17/18; G06N 20/00
(Continued)

(56) References Cited

U.S. PATENT DOCUMENTS 6,298,063 B1    10/2001    Coile et al.
6,438,592 B1    8/2002    Killian
(Continued)

FOREIGN PATENT DOCUMENTS

CN    109359763 A    2/2019
JP    2006-129446 A    5/2006
(Continued)

OTHER PUBLICATIONS

Wilks, Samuel S. "Determination of sample sizes for setting tolerance limits," The Annals of Mathematical Statistics 12.1 (1941): 91-96.
(Continued)

*Primary Examiner* — David R Vincent
(74) *Attorney, Agent, or Firm* — Invoke

(57) ABSTRACT

Techniques are described for generating predictive alerts. In one or more embodiments, a seasonal model is generated, the seasonal model representing one or more seasonal patterns within a first set of time-series data, the first set of time-series data comprising data points from a first range of time. A trend-based model is also generated to represent trending patterns within a second set of time-series data comprising data points from a second range of time that is different than the first range of time. A set of forecasted values is generated based on the seasonal model and the trend-based model. Responsive to determining that a set of alerting thresholds has been satisfied based on the set of forecasted values, an alert is generated.

19 Claims, 14 Drawing Sheets

(51) Int. Cl.
*G06N 5/04* (2006.01)
*G06N 20/00* (2019.01)

(58) Field of Classification Search
USPC .................................................... 706/15, 45
See application file for complete search history.

(56) References Cited

U.S. PATENT DOCUMENTS

| | | | |
|---|---|---|---|
| 6,597,777 B1 | 7/2003 | Ho | |
| 6,643,613 B2 | 11/2003 | McGee et al. | |
| 6,996,599 B1 | 2/2006 | Anders et al. | |
| 7,343,375 B1 | 3/2008 | Dulac | |
| 7,529,991 B2 | 5/2009 | Ide et al. | |
| 7,672,814 B1 | 3/2010 | Raanan et al. | |
| 7,739,143 B1 | 6/2010 | Dwarakanath et al. | |
| 7,739,284 B2 | 6/2010 | Aggarwal et al. | |
| 7,783,510 B1 | 8/2010 | Gilgur et al. | |
| 7,987,106 B1 | 7/2011 | Aykin | |
| 8,200,454 B2 | 6/2012 | Dorneich et al. | |
| 8,229,876 B2 | 7/2012 | Roychowdhury | |
| 8,234,236 B2 | 7/2012 | Beaty et al. | |
| 8,363,961 B1 | 1/2013 | Avidan et al. | |
| 8,576,964 B2 | 11/2013 | Taniguchi et al. | |
| 8,650,299 B1 | 2/2014 | Huang et al. | |
| 8,694,969 B2 | 4/2014 | Bernardini et al. | |
| 8,776,066 B2 | 7/2014 | Krishnamurthy et al. | |
| 8,880,525 B2 | 11/2014 | Galle et al. | |
| 8,930,757 B2 | 1/2015 | Nakagawa | |
| 8,949,677 B1 | 2/2015 | Brundage et al. | |
| 9,002,774 B2 | 4/2015 | Karlsson | |
| 9,141,914 B2 | 9/2015 | Viswanathan et al. | |
| 9,147,167 B2 | 9/2015 | Urmanov et al. | |
| 9,195,563 B2 | 11/2015 | Scarpelli | |
| 9,218,232 B2 | 12/2015 | Khalastchi et al. | |
| 9,292,408 B2 | 3/2016 | Bernstein et al. | |
| 9,323,599 B1 | 4/2016 | Iyer et al. | |
| 9,323,837 B2 | 4/2016 | Zhao et al. | |
| 9,330,119 B2 | 5/2016 | Chan et al. | |
| 9,355,357 B2 | 5/2016 | Hao et al. | |
| 9,367,382 B2 | 6/2016 | Yabuki | |
| 9,389,946 B2 | 7/2016 | Higuchi | |
| 9,495,220 B2 | 11/2016 | Talyansky | |
| 9,514,213 B2 | 12/2016 | Wood et al. | |
| 9,529,630 B1 | 12/2016 | Fakhouri et al. | |
| 9,658,916 B2 | 5/2017 | Yoshinaga et al. | |
| 9,692,662 B2 | 6/2017 | Chan et al. | |
| 9,710,493 B2 | 7/2017 | Wang et al. | |
| 9,727,533 B2 | 8/2017 | Thibaux | |
| 9,740,402 B2 | 8/2017 | Manoharan et al. | |
| 9,779,361 B2 | 10/2017 | Jones et al. | |
| 9,811,394 B1 | 11/2017 | Kogias et al. | |
| 9,961,571 B2 | 5/2018 | Yang et al. | |
| 10,073,906 B2 | 9/2018 | Lu et al. | |
| 10,210,036 B2 | 2/2019 | Iyer et al. | |
| 2002/0019860 A1 | 2/2002 | Lee et al. | |
| 2002/0092004 A1 | 7/2002 | Lee et al. | |
| 2002/0183972 A1 | 12/2002 | Enck et al. | |
| 2002/0188650 A1 | 12/2002 | Sun et al. | |
| 2003/0149603 A1 | 8/2003 | Ferguson et al. | |
| 2003/0224344 A1 | 12/2003 | Shamir et al. | |
| 2004/0088406 A1 | 5/2004 | Corley et al. | |
| 2005/0119982 A1 | 6/2005 | Ito et al. | |
| 2005/0132030 A1 | 6/2005 | Hopen et al. | |
| 2005/0159927 A1 | 7/2005 | Cruz et al. | |
| 2005/0193281 A1 | 9/2005 | Ide et al. | |
| 2006/0087962 A1 | 4/2006 | Golia et al. | |
| 2006/0106743 A1* | 5/2006 | Horvitz | G08G 1/0104 706/21 |
| 2006/0212593 A1 | 9/2006 | Patrick et al. | |
| 2006/0287848 A1 | 12/2006 | Li et al. | |
| 2007/0011281 A1 | 1/2007 | Jhoney et al. | |
| 2007/0150329 A1 | 6/2007 | Brook et al. | |
| 2007/0179836 A1 | 8/2007 | Juang et al. | |
| 2008/0221974 A1 | 9/2008 | Gilgur et al. | |
| 2008/0288089 A1 | 11/2008 | Pettus et al. | |
| 2009/0030752 A1 | 1/2009 | Senturk-Doganaksoy et al. | |
| 2010/0027552 A1 | 2/2010 | Hill | |
| 2010/0050023 A1 | 2/2010 | Scarpelli et al. | |
| 2010/0082132 A1 | 4/2010 | Marruchella et al. | |
| 2010/0082697 A1 | 4/2010 | Gupta et al. | |
| 2010/0185499 A1 | 7/2010 | Dwarakanath et al. | |
| 2010/0257133 A1 | 10/2010 | Crowe et al. | |
| 2010/0324869 A1 | 12/2010 | Cherkasova et al. | |
| 2011/0022879 A1 | 1/2011 | Chavda et al. | |
| 2011/0040575 A1 | 2/2011 | Wright et al. | |
| 2011/0125894 A1 | 5/2011 | Anderson et al. | |
| 2011/0126197 A1 | 5/2011 | Larsen et al. | |
| 2011/0126275 A1 | 5/2011 | Anderson et al. | |
| 2011/0213788 A1 | 9/2011 | Zhao et al. | |
| 2011/0265164 A1 | 10/2011 | Lucovsky et al. | |
| 2012/0005359 A1 | 1/2012 | Seago et al. | |
| 2012/0051369 A1 | 3/2012 | Bryan et al. | |
| 2012/0066389 A1 | 3/2012 | Hegde et al. | |
| 2012/0110462 A1 | 5/2012 | Eswaran et al. | |
| 2012/0110583 A1 | 5/2012 | Balko et al. | |
| 2012/0203823 A1 | 8/2012 | Manglik et al. | |
| 2012/0240072 A1 | 9/2012 | Altamura et al. | |
| 2012/0254183 A1 | 10/2012 | Ailon et al. | |
| 2012/0278663 A1 | 11/2012 | Hasegawa | |
| 2012/0323988 A1 | 12/2012 | Barzel et al. | |
| 2013/0024173 A1 | 1/2013 | Brzezicki et al. | |
| 2013/0080374 A1 | 3/2013 | Karlsson | |
| 2013/0151179 A1* | 6/2013 | Gray | H02J 13/0096 702/62 |
| 2013/0326202 A1 | 12/2013 | Rosenthal et al. | |
| 2013/0329981 A1 | 12/2013 | Hiroike | |
| 2014/0058572 A1* | 2/2014 | Stein | H02J 13/00004 700/291 |
| 2014/0067757 A1 | 3/2014 | Ailon et al. | |
| 2014/0095422 A1 | 4/2014 | Solomon et al. | |
| 2014/0101300 A1 | 4/2014 | Rosensweig et al. | |
| 2014/0215470 A1 | 7/2014 | Iniguez | |
| 2014/0310235 A1 | 10/2014 | Chan et al. | |
| 2014/0310714 A1 | 10/2014 | Chan et al. | |
| 2014/0325649 A1 | 10/2014 | Zhang | |
| 2014/0379717 A1 | 12/2014 | Urmanov et al. | |
| 2015/0033084 A1 | 1/2015 | Sasturkar et al. | |
| 2015/0040142 A1 | 2/2015 | Cheetancheri et al. | |
| 2015/0046123 A1 | 2/2015 | Kato | |
| 2015/0046920 A1 | 2/2015 | Allen | |
| 2015/0065121 A1* | 3/2015 | Gupta | H04W 28/04 455/424 |
| 2015/0180734 A1 | 6/2015 | Maes et al. | |
| 2015/0242243 A1 | 8/2015 | Balakrishnan et al. | |
| 2015/0244597 A1 | 8/2015 | Maes et al. | |
| 2015/0248446 A1 | 9/2015 | Nordstrom et al. | |
| 2015/0251074 A1 | 9/2015 | Ahmed et al. | |
| 2015/0296030 A1 | 10/2015 | Maes et al. | |
| 2015/0312274 A1 | 10/2015 | Bishop et al. | |
| 2016/0034328 A1 | 2/2016 | Poola et al. | |
| 2016/0042289 A1 | 2/2016 | Poola et al. | |
| 2016/0092516 A1 | 3/2016 | Poola et al. | |
| 2016/0105327 A9 | 4/2016 | Cremonesi et al. | |
| 2016/0139964 A1 | 5/2016 | Chen et al. | |
| 2016/0283533 A1 | 9/2016 | Urmanov et al. | |
| 2016/0292611 A1 | 10/2016 | Boe et al. | |
| 2016/0299938 A1 | 10/2016 | Malhotra et al. | |
| 2016/0299961 A1 | 10/2016 | Olsen | |
| 2016/0321588 A1 | 11/2016 | Das et al. | |
| 2016/0342909 A1 | 11/2016 | Chu et al. | |
| 2016/0357674 A1 | 12/2016 | Waldspurger et al. | |
| 2016/0378809 A1 | 12/2016 | Chen et al. | |
| 2017/0061321 A1 | 3/2017 | Maiya et al. | |
| 2017/0262223 A1 | 9/2017 | Dalmatov et al. | |
| 2017/0329660 A1 | 11/2017 | Salunke et al. | |
| 2017/0351563 A1 | 12/2017 | Miki et al. | |
| 2018/0026907 A1 | 1/2018 | Miller et al. | |
| 2018/0039555 A1 | 2/2018 | Salunke et al. | |
| 2018/0052804 A1 | 2/2018 | Mikami et al. | |
| 2018/0053207 A1 | 2/2018 | Modani et al. | |
| 2018/0059628 A1 | 3/2018 | Yoshida | |
| 2018/0081629 A1 | 3/2018 | Kuhhirte et al. | |
| 2018/0219889 A1 | 8/2018 | Oliner et al. | |
| 2018/0321989 A1 | 11/2018 | Shetty et al. | |

(56) References Cited

U.S. PATENT DOCUMENTS

| | | | |
|---|---|---|---|
| 2018/0324199 A1* | 11/2018 | Crotinger | G06F 16/248 |
| 2018/0330433 A1 | 11/2018 | Frenzel et al. | |
| 2019/0042982 A1 | 2/2019 | Qu et al. | |
| 2019/0065275 A1 | 2/2019 | Wong et al. | |
| 2020/0034745 A1 | 1/2020 | Nagpal et al. | |

FOREIGN PATENT DOCUMENTS

| | | |
|---|---|---|
| WO | 2011/071624 A2 | 6/2011 |
| WO | 2013/016584 A1 | 1/2013 |

OTHER PUBLICATIONS

Qiu, Hai, et al. "Anomaly detection using data clustering and neural networks." Neural Networks, 2008. IJCNN 2008.(IEEE World Congress on Computational Intelligence). IEEE International Joint Conference on. IEEE, 2008.

Lin, Xuemin, et al. "Continuously maintaining quantile summaries of the most recent n elements over a data stream," IEEE, 2004.

Greenwald et al. "Space-efficient online computation of quantile summaries." ACM Proceedings of the 2001 SIGMOD international conference on Management of data pp. 58-66.

Dunning et al., Computing Extremely Accurate Quantiles Using t-Digests.

Herbst, "Self-adaptive workload classification and forecasting for proactive resource provisioning", 2014, ICPE'13, pp. 187-198 (Year: 2014).

Faraz Rasheed, "A Framework for Periodic Outlier Pattern Detection in Time-Series Sequences," May 2014, IEEE.

Greunen, "Forecasting Methods for Cloud Hosted Resources, a comparison," 2015, 11th International Conference on Network and Service Management (CNSM), pp. 29-35 (Year 2015).

Hao et al., Visual Analytics of Anomaly Detection in Large Data Streams, Proc. SPIE 7243, Visualization and Data Analysis 2009, 10 pages.

Gunter et al., Log Summarization and Anomaly Detection for Troubleshooting Distributed Systems, Conference: 8th IEEE/ACM International Conference on Grid Computing (GRID 2007), Sep. 19-21, 2007, Austin, Texas, USA, Proceedings.

Ahmed, Reservoir-based network traffic stream summarization for anomaly detection, Article in Pattern Analysis and Applications, Oct. 2017.

Yokoyama, Tetsuya, "Windoss Server 2008, Certification Test, Part 5: Reliability", Apr. 15, 2008, pp. 124-125 along with 4 pages of English Translation.

Willy Tarreau: "HAProxy Architecture Guide", May 25, 2008 (May 25, 2008), XP055207566, Retrieved from the Internet: URL:http://www.haproxy.org/download/1.2/doc/architecture.txt [retrieved on Aug. 13, 2015].

Voras I et al: "Evaluating open-source cloud computing solutions", MIPRO, 2011 Proceedings of the 34th International Convention, IEEE, May 23, 2011 (May 23, 2011), pp. 209-214.

Voras et al.,"Criteria for evaluation of Open Source Cloud Computing Solutions", Information Technology Interfaces (ITI), Proceedings of the ITI 2011 33rd International Conference on Information Technology Interfaces, US, IEEE, Jun. 27-30, 2011, pp. 137-142.

Taylor J W et al: "Forecasting intraday time series with multiple seasonal cycles using parsimonious seasonal exponential smoothing", OMEGA, vol. 40, No. 6, Dec. 2012 (Dec. 2012), pp. 748-757.

Szmit et al., "Usage of Modified Holt-Winters Method in the Anomaly Detection of Network Traffic: Case Studies", Journal of Computer Networks and Communications, vol. 2012, Article ID 192913, Mar. 29, 2012, pp. 1-5.

Somlo, Gabriel, et al., "Incremental Clustering for Profile Maintenance in Information Gathering Web Agents", Agents '01, Montreal, Quebec, Canada, May 28-Jun. 1, 2001, pp. 262-269.

Slipetskyy, Rostyslav, "Security Issues in OpenStack", Master's Thesis, Technical University of Denmark, Jun. 2011, 90 pages.

Nurmi D et al: "The Eucalyptus Open-Source Cloud-Computing System", Cluster Computing and the Grid, 2009. CCGRID '09. 9TH IEEE/ACM International Symposium on, IEEE, Piscataway, NJ, USA, May 18, 2009 (May 18, 2009), pp. 124-131.

NPL: Web document dated Feb. 3, 2011, Title: OpenStack Compute, Admin Manual.

Niino, Junichi, "Open Source Cloud Infrastructure 'OpenStack', its History and Scheme", Available online at <http://www.publickey1.jp/blog/11/openstack_1.html>, Jun. 13, 2011, 18 pages (9 pages of English Translation and 9 pages of Original Document).

Jarvis, R. A., et al., "Clustering Using a Similarity Measure Based on Shared Neighbors", IEEE Transactions on Computers, vol. C-22, No. 11, Nov. 1973, pp. 1025-1034.

Haugen et al., "Extracting Common Time Trends from Concurrent Time Series: Maximum Autocorrelation Factors with Applications", Stanford University, Oct. 20, 2015, pp. 1-38.

Gueyoung Jung et al: "Performance and availability aware regeneration for cloud based multitier applications", Dependable Systems and Networks (DSN), 2010 IEEE/IFIP International Conference on, IEEE, Piscataway, NJ, USA, Jun. 28, 2010 (Jun. 28, 2010), pp. 497-506.

Davies, David L., et al., "A Cluster Separation measure", IEEE Transactions on Pattern Analysis and Machine Intelligence, vol. PAMI-1, No. 2, Apr. 1979, pp. 224-227.

Chris Bunch et al: "AppScale: Open-Source Platform-As-A-Service", Jan. 1, 2011 (Jan. 1, 2011), XP055207440, Retrieved from the Internet: URL:http://128.111.41.26/research/tech reports/reports/2011-01 .pdf [retrieved on Aug. 12, 2015] pp. 2-6.

Anonymous: "High Availability for the Ubuntu Enterprise Cloud (UEC)—Cloud Controller (CLC)", Feb. 19, 2011 (Feb. 19, 2011), XP055207708, Retrieved from the Internet: URL:http://blog.csdn.net/superxgl/article/details/6194473 [retrieved on Aug. 13, 2015] p. 1.

Andrew Beekhof: "Clusters from Scratch—Apache, DRBD and GFS2 Creating Active/Passive and Active/Active Clusters on Fedora 12", Mar. 11, 2010 (Mar. 11, 2010), XP055207651, Retrieved from the Internet: URL:http://clusterlabs.org/doc/en-US/Pacemaker/1.0/pdf/Clusters from Scratch/Pacemaker-1.0-Clusters from Scratch-en-US.pdi [retrieved on Aug. 13, 2015].

Alberto Zuin: "OpenNebula Setting up High Availability in OpenNebula with LVM", May 2, 2011 (May 2, 2011), XP055207701, Retrieved from the Internet: URL:http://opennebula.org/setting-up-highavailability-in-opennebula-with-lvm/ [retrieved on Aug. 13, 2015] p. 1.

"OpenStack Object Storage Administrator Manual", Jun. 2. 2011 (Jun. 2, 2011), XP055207490, Retrieved from the Internet: URL:http://web.archive.org/web/20110727190919/http://docs.openstack.org/cactus/openstack-object-storage/admin/os-objectstorage-adminguide-cactus.pdf [retrieved on Aug. 12, 2015].

"OpenStack Compute Administration Manual", Mar. 1, 2011 (Mar. 1, 2011), XP055207492, Retrieved from the Internet: URL:http://web.archive.org/web/20110708071910/http://docs.openstack.org/bexar/openstack-compute/admin/os-compute-admin-book-bexar.pdf [retrieved on Aug. 12, 2015].

Suntinger, "Trend-based similarity search in time-series data," 2010, Second International Conference on Advances in Databases, Knowledge, and Data Applications, IEEE, pp. 97-106 (Year: 2010).

\* cited by examiner

MULTISCALE METHOD FOR PREDICTIVE ALERTING

BENEFIT CLAIM; RELATED APPLICATIONS

This application claims the benefit of U.S. Provisional Patent Appl. No. 62/463,460, filed Feb. 24, 2017, the entire contents of which are incorporated by reference as if set forth in their entirety.

This application is related to U.S. application Ser. No. 15/266,971, entitled "SEASONAL AWARE METHOD FOR FORECASTING AND CAPACITY PLANNING"; U.S. application Ser. No. 15/445,763, entitled "METHOD FOR CREATING PERIOD PROFILE FOR TIME-SERIES DATA WITH RECURRENT PATTERNS"; U.S. application Ser. No. 15/266,979, entitled "SYSTEMS AND METHODS FOR DETECTING AND ACCOMODATING STATE CHANGES IN MODELLING"; U.S. application Ser. No. 15/140,358, entitled "SCALABLE TRI-POINT ARBITRATION AND CLUSTERING"; U.S. application Ser. No. 15/057,065, entitled "SYSTEM FOR DETECTING AND CHARACTERIZING SEASONS"; U.S. application Ser. No. 15/057,060, entitled "SUPERVISED METHOD FOR CLASSIFYING SEASONAL PATTERNS"; U.S. application Ser. No. 15/057,062, entitled "UNSUPERVISED METHOD FOR CLASSIFYING SEASONAL PATTERNS"; U.S. application Ser. No. 15/140,358, entitled "SCALABLE TRI-POINT ARBITRATION AND CLUSTERING"; and U.S. application Ser. No. 15/155,486, entitled "CORRELATION-BASED ANALYTIC FOR TIME-SERIES DATA", the entire contents for each of which are incorporated by reference herein as if set forth in their entirety.

TECHNICAL FIELD

The present disclosure generally relates to time-series analytics. In particular, the present disclosure relates to generating predictive alerts to provide early warning for forecasted problems.

BACKGROUND

Organizations, data analysts, and other entities are often interested in analyzing trends and patterns within a time-series signal. In the context of capacity planning, for example, a forecast may be used to determine how many hardware and/or software resources to deploy to keep up with demand. An inaccurate forecast may result in poor capacity planning decisions, leading to an inefficient allocation of resources. For instance, a forecast that underestimates future demand may lead to insufficient hardware and/or software resources being deployed to handle incoming requests. As a result, the deployed resources may be over-utilized, increasing the time spent on processing each request and causing performance degradation. On the other hand, a forecast that overestimates future demand may result in too many resources being deployed. In this case, the deployed resources may be underutilized, which increases costs and inefficiencies associated with maintaining a datacenter environment.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section.

BRIEF DESCRIPTION OF THE DRAWINGS

The embodiments are illustrated by way of example and not by way of limitation in the figures of the accompanying drawings. It should be noted that references to "an" or "one" embodiment in this disclosure are not necessarily to the same embodiment, and they mean at least one. In the drawings.

DETAILED DESCRIPTION

Figure 1A:
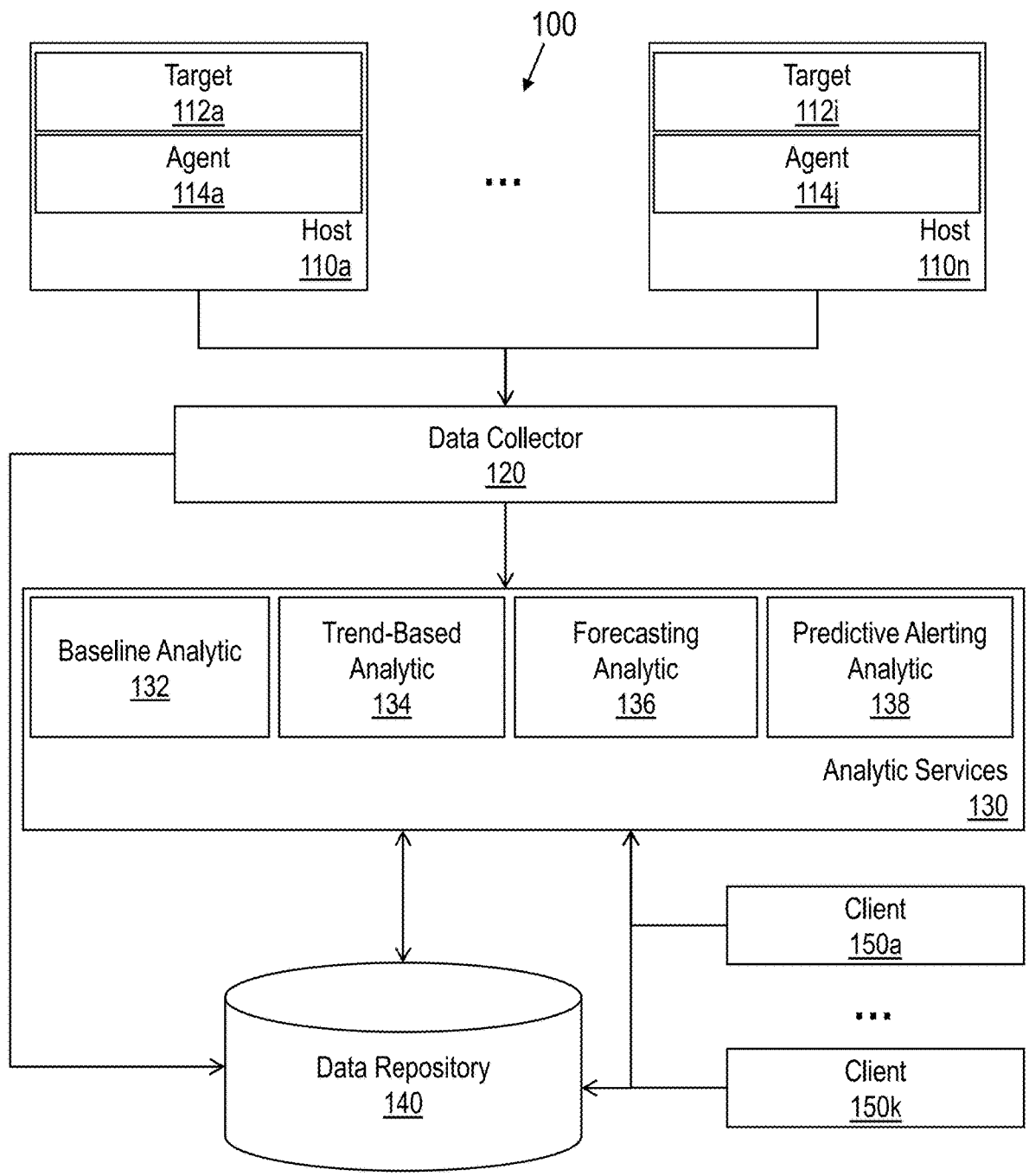
FIG. 1A illustrates an example system for generating predictive alerts based on long and short-term trends in accordance with one or more embodiments.

In the following description, for the purposes of explanation, numerous specific details are set forth in order to provide a thorough understanding. One or more embodiments may be practiced without these specific details. Features described in one embodiment may be combined with features described in a different embodiment. In some examples, well-known structures and devices are described with reference to a block diagram form in order to avoid unnecessarily obscuring the present invention.

1. GENERAL OVERVIEW
2. ARCHITECTURAL OVERVIEW
3. BASELINE MODELS
4. LOCALIZED TRENDING
5. COMBINED FORECAST
6. PREDICTIVE ALERTING
7. MICROSERVICE-BASED ALERTING
8. PREDICTIVE ALERTING CLOUD SERVICE
9. HARDWARE OVERVIEW
10. MISCELLANEOUS; EXTENSIONS

1. General Overview

A time-series signal may exhibit various behaviors such as seasonal variations in peaks and lows, trends, and/or states. A failure to account for such characteristics may result in unreliable predictions and poor planning decisions. For instance, a middleware administrator in charge of a web-service based application may be responsible for ensuring that there are enough hardware and/or software resources during peak times to satisfy demand. The administrator may plot a trend line using a linear regression model to predict whether current hardware is sufficient for peak months. The administrator may configure an alert to be generated if the trend line crosses a threshold indicating that predicted resource usage will not be satisfied by the currently deployed resources.

Linear regression models typically do not account for seasonal fluctuations in time-series data. As such, predictive alerts triggered by a linear regression model are subject to false positives (i.e., alerting when behavior is not problematic) and false negatives (i.e., not alerting when behavior is problematic). For example, seasonal highs and lows may cause a linear regression model to underestimate future peak values or overestimate future trough values, both of which lead to a wasteful use of computational resources (including computer hardware, software, storage, and processor resources, and any services or other resources built on top of those resources). Other factors, such as increased volume around holidays or sales events, may also cause the linear regression model to generate inaccurate forecasts.

Rather than relying on linear regression, an administrator may instead use a Holt-Winters forecasting model to account for seasonality in the time-series. The Holt-Winters forecasting model relies on a triple exponential smoothing function to model levels, trends, and seasonality within the time-series. A "season" in this context refers to a period of time before an exhibited behavior begins to repeat itself. The additive seasonal model is given by the following formulas:

$$L_t = \alpha(X_t - S_{t-p}) + (1-\alpha)(L_{t-1} + T_{t-1}) \quad (1)$$

$$T_t = \gamma(L_t - L_{t-1}) + (1-\gamma)T_{t-1} \quad (2)$$

$$S_t = \delta(X_t - L_t) + (1-\delta)S_{t-p} \quad (3)$$

where $X_t$, $L_t$, $T_t$, and $S_t$ denote the observed level, local mean level, trend, and seasonal index at time t, respectively. Parameters $\alpha$, $\gamma$, $\delta$ denote smoothing parameters for updating the mean level, trend, and seasonal index, respectively, and p denotes the duration of the seasonal pattern. The forecast is given as follows:

$$F_{t+k} = L_t + k\, T_t + S_{t+k-p} \quad (4)$$

where $F_{t+k}$ denotes the forecast at future time t+k.

The additive seasonal model is typically applied when seasonal fluctuations are independent of the overall level of the time-series data. An alternative, referred to as the multiplicative model, is often applied if the size of seasonal fluctuations vary based on the overall level of the time series data. The multiplicative model is given by the following formulas:

$$L_t = \alpha(X_t/S_{t-p}) + (1-\alpha)(L_{t-1} + T_{t-1}) \quad (5)$$

$$T_t = \gamma(L_t - L_{t-1}) + (1-\gamma)T_{t-1} \quad (6)$$

$$S_t = \delta(X_t/L_t) + (1-\delta)S_{t-p} \quad (7)$$

where, as before, $X_t$, $L_t$, $T_t$, and $S_t$ denote the observed level, local mean level, trend, and seasonal index at time t, respectively. The forecast is then given by the following formula:

$$F_{t+k} = (L_t + k\, T_t)S_{t+k-p} \quad (8)$$

While the Holt-Winter additive and multiplicative models take into account seasonal indices to generate the forecast, these models can be brittle in the manner in which forecasts are generated. For instance, the above forecasting models are not tailored to react to short-term patterns detected in time-series data. If a time-series experiences a sudden shift in a trend, state, or seasonal pattern, then the Holt-Winters model may overestimate or underestimate future values. As previously indicated, inaccurate forecasting may lead an automated alerting system to generate false positives and/or false negatives.

Systems and methods are described for performing predictive alerting based on long-term and short term patterns. In one or more embodiments, a forecast is generated based on at least one time-series model that represents long-term patterns and at least one time-series model that represents short-term (or "local") patterns. Using the different time-series models, a forecasting analytic may project future values that account for long-term patterns and short-term patterns within a set of time-series data. As the recent observations progressively diverge and drift from expectations, an alert may be generated if a set of one or more alert thresholds is satisfied. If recent observations match or otherwise show little deviation from long-term patterns, then no alert is generated.

In one or more embodiments, a process and system for generating predictive alerts comprises logic for generating a seasonal model relative to a seasonal period such that the seasonal model represents one or more seasonal patterns within a first set of time-series data. A trend-based model is also generated such that the trend-based model represents trending patterns within a second set of time-series data.

In one or more embodiments, seasonal model represents long-term patterns and the trending model represents local and short-term patterns. For example, the first set of time-series data, used to generate the seasonal model, may be collected over a first range of time and the second set of time-series data, used to generate the trend-based model, may be collected over a second range of time such that the first set of time-series data includes a plurality of data points that are older than any data point in the second set of time-series data. The first range of time may be longer than the second range of time, spanning multiple iterations of a seasonal period. The first set of time-series data may or may not include data points in the second set of time-series data.

In one or more embodiments, a set of forecasted values is generated based on the seasonal model and the trend-based model. The set of forecasted values represent a projection based upon both long and short-term patterns represented by the seasonal and trend-based models, respectively.

Based on the set of forecasted values, a predictive alerting analytic determines whether a set of one or more alerting thresholds has been satisfied. For example, the predictive alerting analytic may determine whether local resource usage patterns are likely to cross a threshold in the near future. If the set of one or more alerting thresholds is satisfied, then an alert is generated. The alert provides early warning so that responsive action may be taken before a problem occurs.

2. Architectural Overview

A time series signal comprises a sequence of values that are captured over time. The source of the time series data and the type of information that is captured may vary from implementation to implementation. For example, a time series may be collected from one or more software and/or hardware resources and capture various performance attributes of the resources from which the data was collected. As another example, a time series may be collected using one or more sensors that measure physical properties, such as temperature, pressure, motion, traffic flow, or other attributes of an object or environment.

FIG. 1A illustrates an example system for generating predictive alerts based on long and short-term trends in accordance with one or more embodiments. System 100 generally comprises hosts 110a to 110n, data collector 120, analytic services 130, data repository 140, and clients 150a to 150k. Components of system 100 may be implemented in one or more host machines operating within one or more clouds or other networked environments, depending on the particular implementation.

Hosts 110a to 110n represent a set of one or more network hosts and generally comprise targets 112a to 112i and agents 114a to 114j. A "target" in this context refers to a resource that serves as a source of time series data. For example, a target may be a software deployment such as a database server instance, middleware instance, or some other software resource executing on a network host. In addition or alternatively, a target may be a hardware resource, an environmental characteristic, or some other physical resource for which metrics may be measured and tracked.

Agents 114a to 114j comprise hardware and/or software logic for capturing time-series measurements from a corresponding target (or set of targets) and sending these metrics to data collector 120. In one or more embodiments, an agent includes a process, such as a service or daemon, that executes on a corresponding host machine and monitors one or more software and/or hardware resources that have been deployed. In addition or alternatively, an agent may include one or more hardware sensors, such as microelectromechanical (MEMs) accelerometers, thermometers, pressure sensors, etc., that capture time-series measurements of a physical environment and/or resource. Although only one agent and target is illustrated per host in FIG. 1A, the number of agents and/or targets per host may vary from implementation to implementation. Multiple agents may be installed on a given host to monitor different target sources of time series data.

Data collector 120 includes logic for aggregating data captured by agents 114a to 114j into a set of one or more time-series. Data collector 120 may store the time series data in data repository 140 and/or provide the time-series data to analytic services 130. In one or more embodiments, data collector 120 receives data from agents 114a to 114j over one or more data communication networks, such as the Internet. Example communication protocols that may be used to transport data between the components illustrated within system 100 may include, without limitation, the hypertext transfer protocol (HTTP), simple network management protocol (SNMP), and other communication protocols of the internet protocol (IP) suite.

Analytic services 130 include a set of analytics that may be invoked to process time-series data. Analytic services 130 may be executed by one or more of hosts 110a to 110n or by one or more separate hosts, such as a server appliance. Analytic services 130 comprises baseline analytic 132, trend-based analytic 134, forecasting analytic 136, and predictive alerting analytic 138. Each service implements a function or set of functions as described in further detail below. In other embodiments, the functions or set of functions implemented by different services may be implemented by a single service. Additionally or alternatively, functions performed by a single service may be executed by different services, depending on the particular implementation.

Figure 1B:
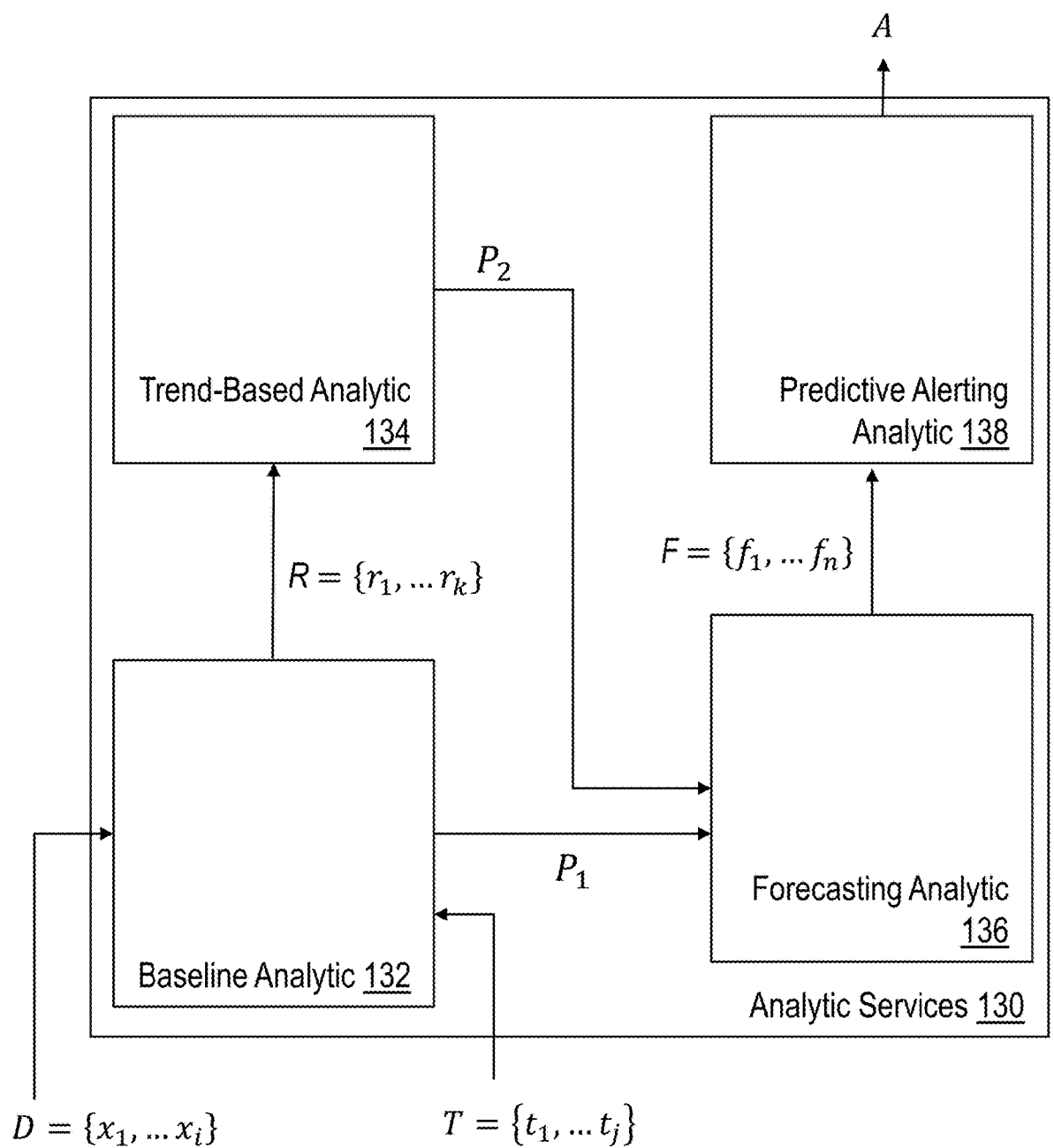
FIG. 1B illustrates an example set of analytic services for generating predictive alerts in accordance with one or more embodiments.

FIG. 1B illustrates an example implementation of analytic services 130 for generating predictive alerts in accordance with one or more embodiments. Baseline analytic 132 receives a training dataset denoted T comprising time-series data points $\{t_1, \ldots, t_j\}$. Responsive to receiving training dataset T, baseline analytic trains a baseline model that represents patterns within training dataset T Example techniques for training a baseline model are described in U.S. Provisional Patent Appl. No. 62/370,880, entitled "UNSUPERVISED METHOD FOR BASELINING AND ANOMALY DETECTION IN TIME-SERIES DATA FOR ENTERPRISE SYSTEMS", previously incorporated by reference. Baseline analytic 132 uses the trained baseline model to evaluate an incoming time-series dataset denoted D, which comprises data points $\{x_1, \ldots, x_i\}$. Based on the evaluation, baseline analytic 132 generates a set of residuals R comprising data points $\{r_1, \ldots, r_k\}$ that measure the difference between the baseline and the observed data points in time-series dataset D.

Trend-based analytic 134 is configured to model trends in the set of residuals R Trend-based analytic 134 may buffer or otherwise receive the set of residuals R from baseline analytic 132. Responsive to receiving the set of residual R, trend-based analytic 134 generates a trend line and/or other trend pattern, denoted $P_2$ to represent one or more trends in the baseline residuals.

In one or more embodiments, baseline analytic 132 is configured to model long-term patterns. For example, training dataset T may comprise data received over multiple iterations of a seasonal period. In a weekly season, for instance, training dataset T may comprise data points collected over multiple weeks. This allows baseline analytic 132 to model seasonal behaviors that recur over multiple instances of a season. In a daily season, training dataset T may comprise data points collected over multiple days. Baseline analytic 132 trains one or more baseline models, denoted $P_1$ to represent behavioral patterns learned over multiple seasonal periods.

In one or more embodiments, trend-based analytic 134 is configured to model short-term patterns. For example, dataset D may comprise recently collected data from targets 112a-i. The data points be collected within a single season or span multiple iterations of a season, depending on the particular implementation. The data points may be added to training set T to retrain the baseline model (training set T may also include data points older than any data points in dataset D). The trending patterns, denoted $P_2$ are provided to forecasting analytic 136.

Forecasting analytic 136 is configured to generate a forecast based on the baseline model(s) $P_1$ and trending pattern(s) $P_2$. In one or more embodiments, forecasting analytic 136 uses the baseline model to predict where the time series will go given the learned, long term patterns. Forecasting analytic 136 then generates a final forecast by adding the trend in the baseline residuals to the baseline projection. By using varying scales (i.e. a baseline that captures long term behavior and residual trend model that represents local behavior), forecasting analytic 136 can detect when local behavior will deviate from long-term behavior.

Predictive alerting analytic 138 is configured to generate alerts based on a set of alerting thresholds. Predictive alerting analytic 138 receives forecast F, comprising forecasted values $\{f_1, \ldots, f_n\}$. Predictive alerting analytic 138 compares the forecast values with one or more alerting thresholds, as described in further detail below. If the set of alerting thresholds are satisfied, then predictive alerting analytic generates an alert denoted A.

Referring again to FIG. 1A, data repository 140 includes volatile and/or non-volatile storage for storing data that is generated and/or used by analytic services 130. Example data that may be stored may include, without limitation, time-series data collected by data collector 120, baseline/long-term time-series models, local time-series models, forecasts, and alert data. Data repository 140 may reside on a different host machine, such as a storage server that is physically separate from analytic services 130, or may be allocated from volatile or non-volatile storage on the same host machine.

Clients 150a to 150k represent one or more clients that may access analytic services 130 to generate forecasts and/or perform capacity planning operations. A "client" in this context may be a human user, such as an administrator, a client program, or some other application instance. A client may execute locally on the same host as analytic services 130 or may execute on a different machine. If executing on a different machine, the client may communicate with analytic services 130 via one or more data communication protocols according to a client-server model, such as by submitting HTTP requests invoking one or more of the services and receiving HTTP responses comprising results generated by one or more of the services. Analytic services 130 may provide clients 150a to 150k with an interface through which one or more of the provided services may be invoked. Example interfaces may comprise, without limitation, a graphical user interface (GUI), an application programming interface (API), a command-line interface (CLI) or some other interface that allows a user to interact with and invoke one or more of the provided services.

3. Baseline Models

As previously indicated, baseline analytic 132 is configured to train a set of one or more models. In one or more embodiments, training is performed on a continuous and/or periodic basis. For example, baseline analytic 132 may continuously or periodically receive time-series data collected by data collector 120. Baseline analytic 132 may use this data to generate, train, and retrain a set of baseline models that represent seasonal and/or non-seasonal patterns.

Figure 2:
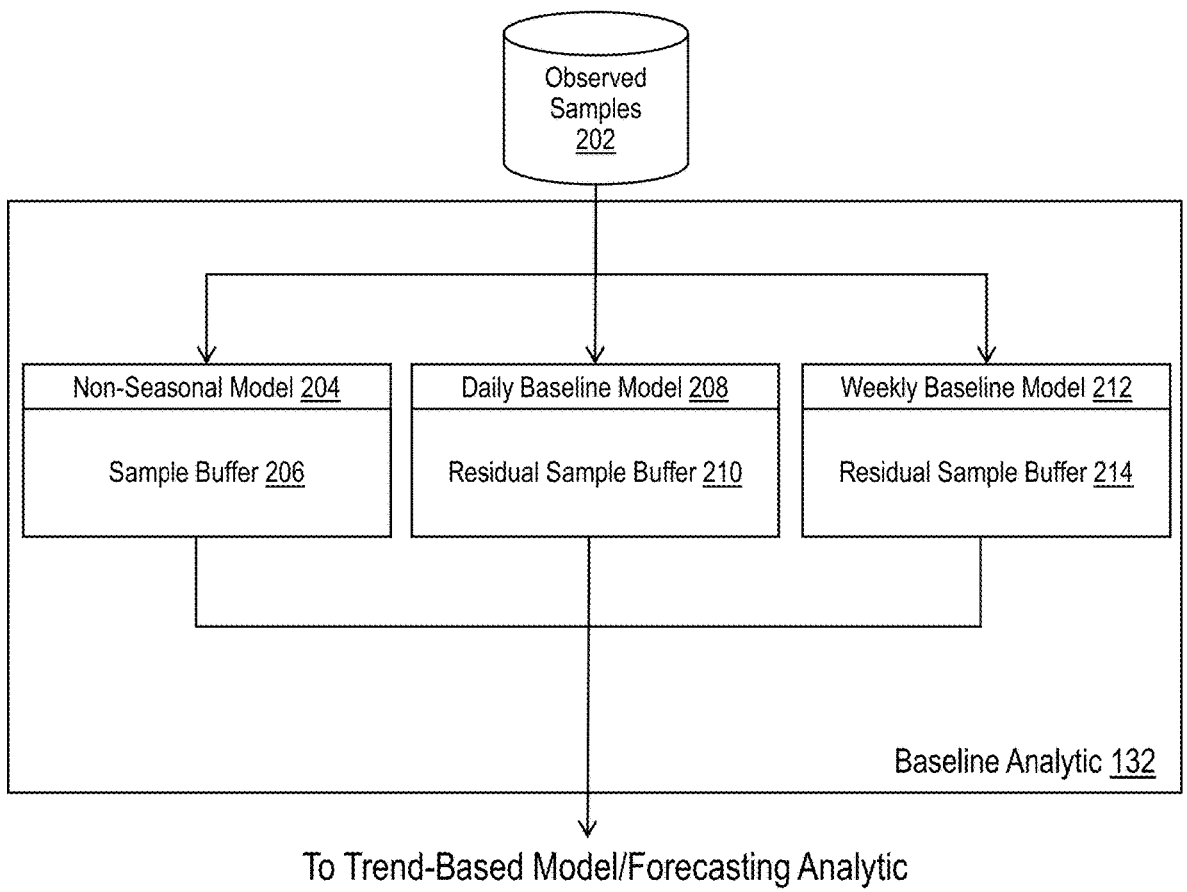
FIG. 2 illustrates an example baseline analytic for comparing time-series data with a set of one or more baseline models in accordance with one or more embodiments.

FIG. 2 illustrates an example baseline analytic for comparing time-series data with a set of one or more baseline models in accordance with one or more embodiments. Baseline analytic 132 trains non-seasonal model 204, daily baseline model 208, and weekly baseline model 212. Non-seasonal baseline model 204 is used when the training dataset T does not exhibit seasonal behavior, daily baseline model 208 when training dataset T includes daily seasonal patterns, and weekly baseline model 212 when training dataset T includes weekly seasonal patterns. Additionally or alternatively, other seasonal models may be used, including, but not limited to, monthly, quarterly, annual, biannual, and holiday seasonal models.

For non-seasonal model 204, baseline analytic 132 may train any non-seasonal time-series model using training dataset T. In one or more embodiments, the dataset D is used as the training dataset T In this scenario, baseline analytic 132 buffers dataset D in sample buffer 206. Baseline analytic 132 then generates a non-seasonal model by fitting a function (e.g., using linear regression, a Theil-Sen estimator, or any other best fit function) to the buffer of samples. In this case, the set of residuals is zero since the dataset D is the same as the training dataset T.

New samples of time-series data may be continuously added to sample buffer 206, which retains a configurable duration of samples. The buffer retention time may vary from implementation to implementation. In one or more embodiments, the buffer retention time is a function of the forecast horizon. For example, if forecasting analytic 136 is configured to generate forecasts two hours into the future, then two times the forecast horizon (4 hours) of the most recent samples may be retained. Other retention functions may also be used, depending on the particular implementation.

For seasonal models, including daily baseline model 208 and weekly baseline model 212, the training set T includes data older than the buffered dataset D. Thus, the seasonal models allow predictions based on learned, long-term patterns. The seasonal baseline models may also be associated with a buffer that stores a duration of samples. The retention time for samples may be a function of the forecast horizon (e.g., one or more times the duration of the forecast horizon) such as described above for the non-seasonal model buffer. The seasonal models may be configured to buffer baseline residuals in addition or as an alternative to buffering samples from time-series dataset D.

Referring to baseline model 208, dataset D is compared with learned daily patterns, and the observed differences are stored in residual sample buffer 210. For example, daily resource usage at 9:00 a.m. may deviate from one day to the next. The differences between the observed data at 9:00 a.m. and/or other hours in the day and the baseline model for the same hour may be captured and stored in residual sample buffer 210.

Weekly baseline model 212 represents weekly time-series data learned from training dataset T Residual sample buffer 214 stores residual values obtained from evaluating dataset D using weekly baseline model 212. The residuals capture differences between the observed values in the time-series dataset D and corresponding values in the weekly baseline.

Figure 3:
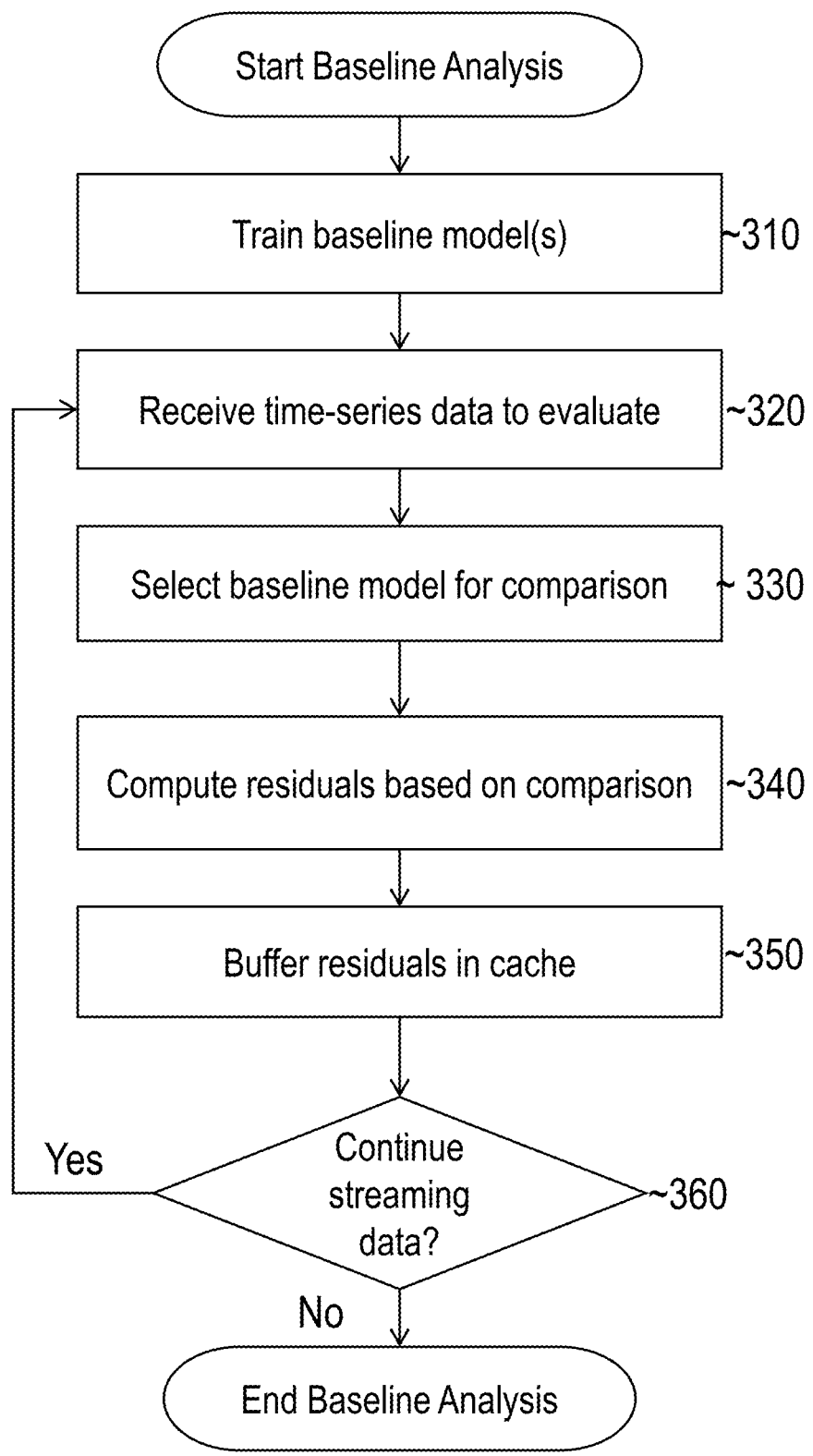
FIG. 3 illustrates an example set of operations for generating a set of baseline residuals in accordance with one or more embodiments.

FIG. 3 illustrates an example set of operations for generating a set of baseline residuals in accordance with one or more embodiments. The set of operations includes training a set of one or more baseline models (Operation 310). Training may happen continuously or periodically as new time-series data is received. In other embodiments, training may be performed on-demand. For example, a user may request training to be performed on a specified set of training data or using data that is streamed from data collector 120.

The baseline models that are trained at operation 310 may vary from implementation to implementation. As previously described, the baseline models may include one or more non-seasonal models and/or one or more seasonal models. Baseline analytic 132 may continuously train multiple models or a single model.

Once one or more baseline models have been trained, baseline analytic receives a set of time-series data to evaluate (Operation 320). For example, data measuring resource usage and performance may be continuously streamed from targets 112a-i. The data may be used for evaluation, as described further below. The data may further be used to retrain the baseline models.

During baseline evaluation, baseline analytic 134 selects a baseline model for comparison with the newly received time-series data (Operation 330). For example, baseline analytic 132 may select one or more of non-seasonal model 204, daily baseline model 208, or weekly baseline model 212. Additionally or alternatively, other baseline models (e.g., monthly seasonal models) may also be selected.

Based on the comparison with the one or more seasonal baseline models, baseline analytic 132 generates a set of residuals (Operation 340). A residual may be computed as the difference between an observed value in the newly received time-series data set and a corresponding value in the baseline. For example, a sample taken at 10:05 a.m. may be compared with a corresponding value for that time (or the nearest neighbor time) in seasonal model. The difference in the magnitude of the two values may be stored as a residual value for the corresponding sample.

In one or more embodiments, baseline analytic 132 buffers the baseline residuals in a cache (Operation 350). As previously indicated, baseline analytic 132 may store residuals in residual sample buffer 210 and/or residual sample buffer 214 for a threshold period of time. As new residuals are computed, cached residual values may be overwritten if they are older than the threshold.

Baseline analytic 132 may determine whether to continue streaming data at any point in time (Operation 360). For example, baseline analytic 132 may stream data as long as predictive alerting is enabled. As data streaming is enabled, the process returns to operation 320, and the newly received data is evaluated and used to compute/cache new residuals. The newly received time-series data may also be used to retrain the baseline models, depending on the particular implementation. If there are no new time-series data to evaluate, then baseline analysis may stop.

4. Localized Trending

In one or more embodiments, trend-based analytic 134 is configured to generate a trend-based model that captures short-term trends. "Short-term" in this context is a period of time relative to "long-term" behavior captured by the seasonal/baseline models previously described. A short-term pattern may represent behavior learned from data points that span multiple hours, days, weeks, months or any other timeframe. A long-term pattern may represent behavior captured from a dataset that includes data points older than the dataset used to generate the short-term pattern. The dataset used to generate the long-term pattern may or may not include data points used to train a short-term time-series model.

In one or more embodiments, a short-term pattern may be determined from consecutive data points that are within a single instance of a season. A long-term pattern, by comparison, is generated based on data points from multiple instances of a season. For example, a daily seasonal model may be generated from data points captured over multiple instances of a day, and a short-term model may be generated from consecutive data points captured over a subperiod (e.g., a few hours) within a day. As another example, a weekly seasonal model may be generated from data points captured over multiple iterations of a week, and a short-term model may be generated from consecutive data points captured over any subperiod (e.g., a few hours or days) within the week.

Figure 4:
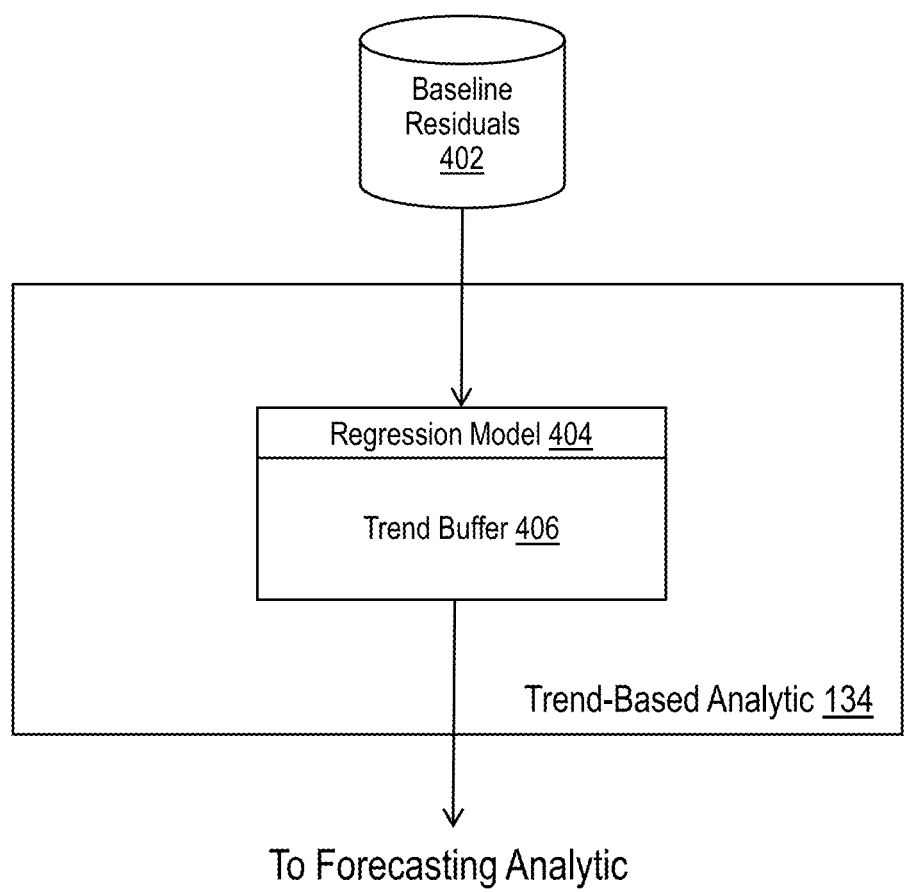
FIG. 4 illustrates an example trend-based analytic that models short-term trends in accordance with one or more embodiments.

FIG. 4 illustrates an example trend-based analytic that models short-term trends in accordance with one or more embodiments. Trend-based analytic fetches baseline residuals 402 from a residual buffer cache. The baseline residuals are used to train regression model 404, which stores the trend data in trend buffer 406. For example, regression model 404 may use a Thiel-Sen estimator, linear regression model or some other linear best-fit function to compute a trend line in the baseline residuals. In other embodiments, a nonlinear best-fit function may be used to compute the trend data.

Figure 5:
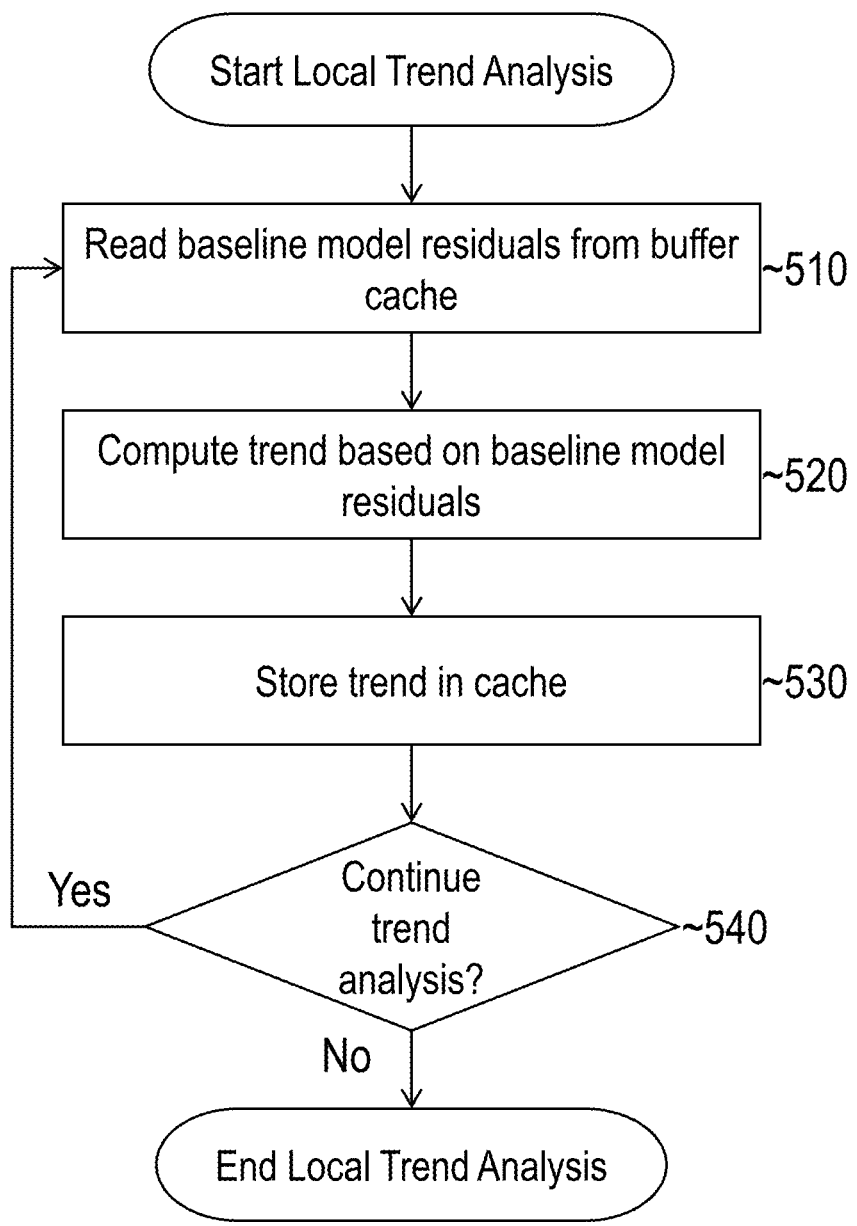
FIG. 5 illustrates an example set of operations for generating local trend patterns in accordance with one or more embodiments.

FIG. 5 illustrates an example set of operations for generating local trend patterns in accordance with one or more embodiments. The set of operations includes reading a set of baseline model residuals from a residual buffer cache (Operation 510). For example, trend-based analytic 134 may read baseline residuals from residual sample buffer 210 or 214.

After reading the baseline residual values, trend-based analytic 134 generates a trend pattern (Operation 520). As previously indicated, the trend may be generated using a regression model or some other best-fit function.

Trend-based analytic then stores the trend data in a cache (Operation 530). For example, trend-based analytic 134 may store data defining a trend line (e.g., data identifying the intercept and slope) or some other trending pattern in trend buffer 406.

In one or more embodiments, trend-based analytic 134 continuously or periodically updates the trend model. For example, trend-based analytic 134 may periodically read baseline residuals from sample buffer 210 and/or 214 and update the trend model accordingly. As part of the process, trend-based analytic 134 determines whether to continue trend analysis (Operation 540). The determination may be made based on whether predictive alerts are enabled/disabled in the same way as described above for baseline analysis or based on any other criteria. If trend analysis is to continue, then trend-based analytic 134 may periodically or continuously read new values from the baseline buffer cache, returning to operation 510, and repeat the process.

Figure 6:
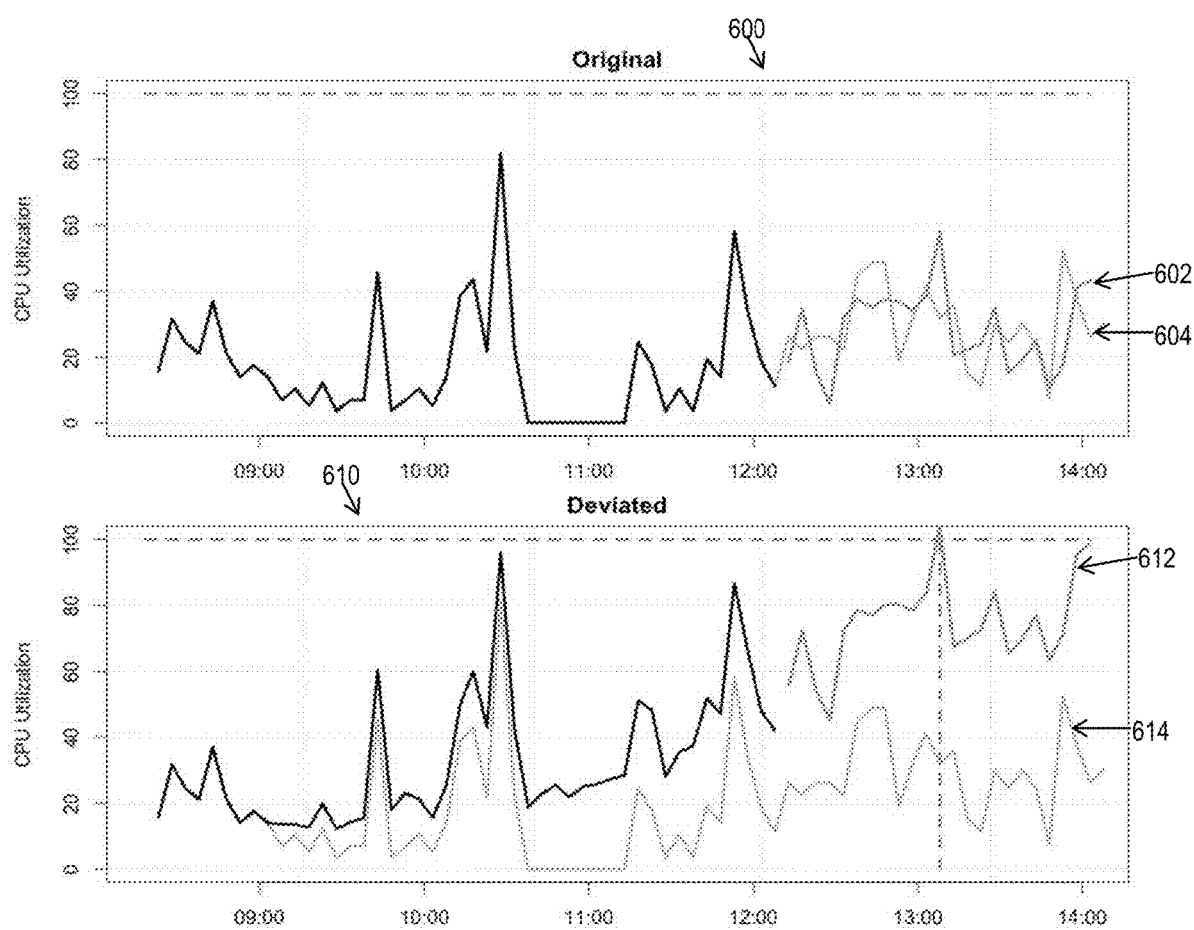
FIG. 6 illustrates a set of charts showing different trends in baseline residuals, in accordance with one or more embodiments

FIG. 6 illustrates a set of charts showing different trends in baseline residuals, in accordance with one or more embodiments. Chart 600 depicts observed data stream 602 and baseline 604. As can be seen, there is no significant deviation between the baseline and observed values. As a result, the trend in residual values is zero. Referring to chart 610, data stream 612 deviates significantly from baseline 614. As a result, the local trend of baseline residuals is positive.

5. Combined Forecast

Forecasting analytic 136 generates a set of forecasted values based on the long-term and local patterns represented by $P_1$ and $P_2$, respectively. In one or more embodiments, the forecast indicates how much local behavior is deviating from the baseline patterns. If the time-series is locally progressing as expected (i.e., the trend in residuals is zero), then the local forecast matches (or substantially matches) the base line. If the local behavior is deviating from expectations, the forecast reflects this discrepancy by an amount that is proportional to how different local patterns are from expected. The greater the trend in residuals, the greater the deviation in forecasted values from the baseline.

Figure 7:
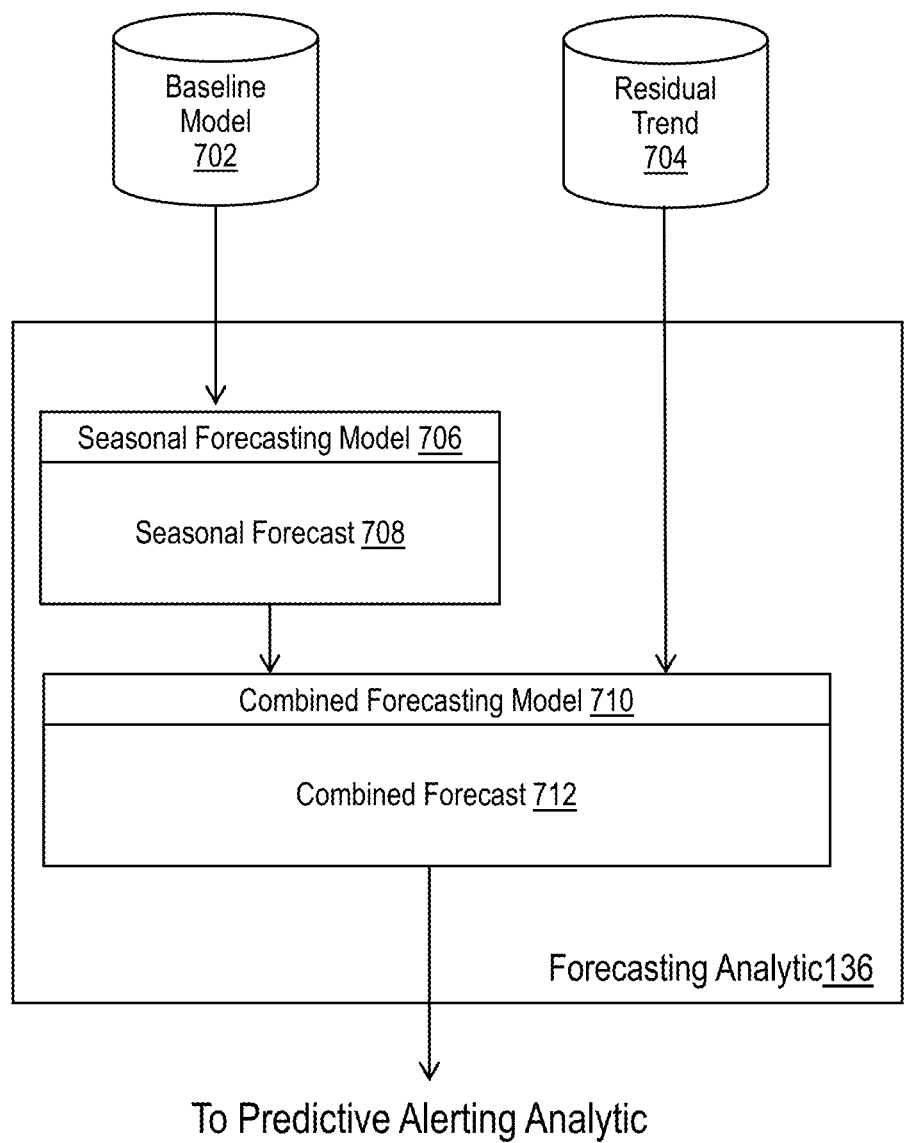
FIG. 7 illustrates an example forecasting analytic that generates forecast values based on long and short-term patterns in accordance with one or more embodiments.

FIG. 7 illustrates an example forecasting analytic that generates forecast values based on long and short-term patterns in accordance with one or more embodiments. Forecasting analytic 136 fetches baseline model 702 and residual trend data 704. Seasonal forecasting model 706 uses the baseline model 702 to generate seasonal forecast 708. The seasonal forecast may be generated using the Additive or Multiplicative Holt Winters model previously described. Other examples for generating seasonal forecasts are described in U.S. application Ser. No. 15/266,971, entitled "SEASONAL AWARE METHOD FOR FORECASTING AND CAPACITY PLANNING".

Combined forecasting model 710 adds residual trend data 704 and the seasonal forecast to generate combined forecast 712. In other words, combined forecasting model generates a set of forecasted values based on both long-term seasonal behavior and the localized residual trend. By adding the residual trend line to a baseline forecast, the forecast matches the baseline if the residual trend is zero. On the other hand, combined forecast 712 diverges proportionally to localized trends away from the baseline.

Figure 8:
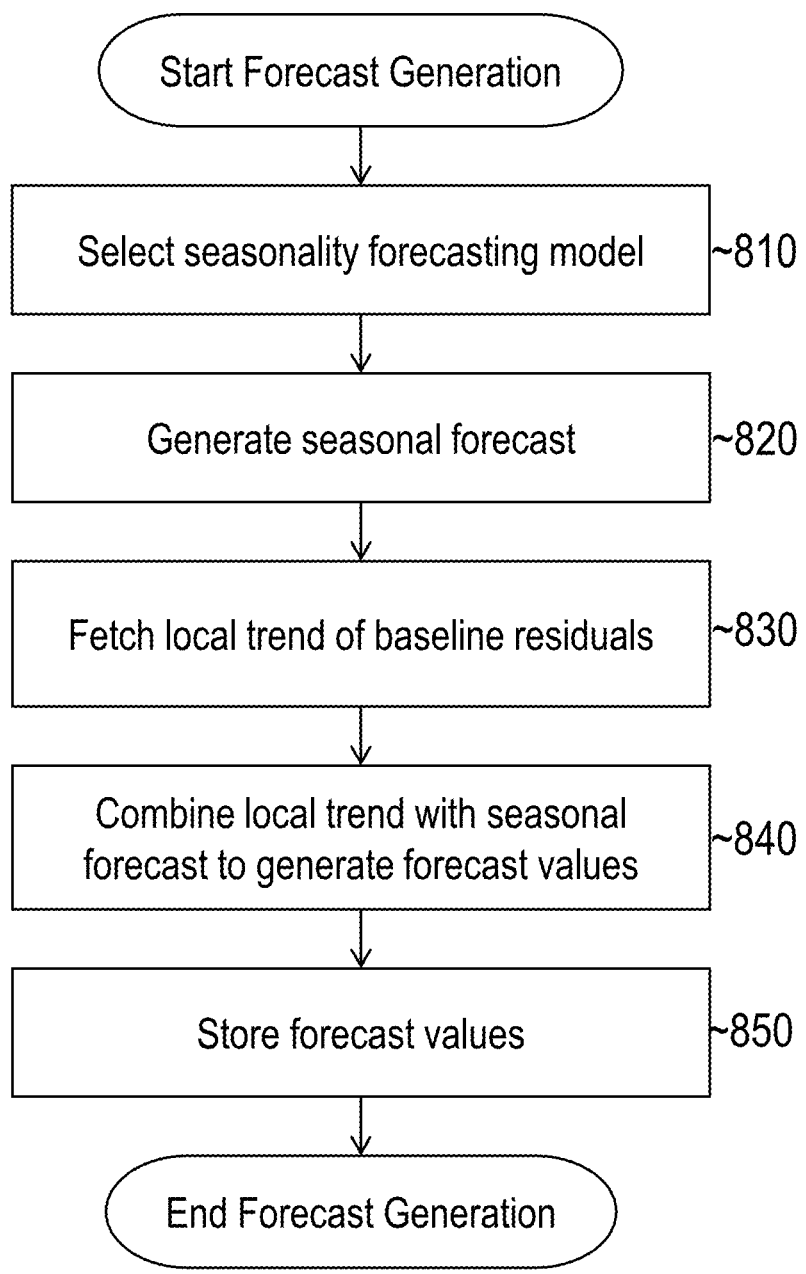
FIG. 8 illustrates an example set of operations for generating a forecast in accordance with one or more embodiments.

FIG. 8 illustrates an example set of operations for generating a forecast in accordance with one or more embodiments. The set of operations includes selecting a seasonal forecasting model (Operation 810). The selection may be performed by analyzing the baseline models to determine which model best represents seasonal patterns within a set of time-series logic. The best model may be selected based on which model exhibits the highest correlation across time periods and dominant frequencies. For example, the weekly model may be selected if the weekly seasonal pattern has a high correlation across multiple iterations of a weekly season for values that frequently recur. If the daily model has higher correlation with the training data, then the daily model may be selected instead. Other seasonal models (e.g., monthly, quarterly, etc.) based on correlation. If the correlation of each seasonal model falls bellows a threshold, then the non-seasonal model may be selected.

If a seasonal model is forecast, then forecasting analytic 136 generates a seasonal forecast (Operation 820). The seasonal forecast may be generated using any of the techniques previously described including, but not limited to, the Additive and Multiplicative Holt-Winters models.

During the forecast generation phase, forecasting analytic 136 fetches the local trend of baseline residuals (Operation 830). For example, forecasting analytic 136 may fetch the local trend data from trend buffer 406. As previously indicated, the buffers may only retain data for a threshold retention time, which may be a function of the forecast horizon. For example, a buffer may retain trend/residual data for twice the forecast horizon. Thus, if the forecast horizon is one day, then two days of residual data may be maintained. If the forecast horizon is two weeks, then four weeks of residual data may be maintained. In other cases, one or more times the forecast horizon may be maintained in the buffer, depending on the particular implementation.

Forecasting analytic 136 generates a final forecast by combining the local trend with the seasonal forecast (Operation 840). In one or more embodiments, the local trend is added to the seasonal forecast. Thus, the final forecast matches the baseline seasonal forecast if the trend in residuals is zero and deviates from the baseline forecast in proportion to the residual trend. Other aggregation functions may also be used in addition or as an alternative to adding the local and seasonal forecasts together.

Once generated, the set of forecasted values is stored in volatile and/or non-volatile storage (Operation 850). These values may be displayed via interactive charts (e.g., graphs, pie charts, etc.) to allow users to view and interact with the forecast. For example, a user may request a forecast of overall CPU usage for a set of targets for the next two days. In response, the forecasting analytic may compute a combined forecast and present the forecasted values to the user. Forecasts may be generated for individual targets as well as aggregated across different targets. Users may view the overall forecast across multiple targets and drill down to see forecasts on individual targets. Predictive alerts may be generated based on a set of alerting thresholds as described further below.

6. Predictive Alerting

In one or more embodiments, predictive alerting analytic 136 is configured to generate alerts based on forecasted values. Predictive alerts may be generated to warn users when local behavior is projected to deviate from baseline behavior by a threshold amount. For example, predictive alerts may notify a user when resource usage is projected to exceed the capacity of currently deployed resources or when the currently deployed resources significantly more capacity than projected usage warrants.

In one or more embodiments, predictive alerting analytic 136 generates an alert when one or more forecasted values cross a threshold. Referring again to chart 600 in FIG. 6, for example, the local patterns substantially match the baseline. If a threshold for CPU usage is set at 100%, as illustrated by the dotted line, there the combined forecast indicates that the local behavior is not likely to violate the threshold in the near future. Thus, no alarm is generated.

Referring to chart 610, the local observations deviate from long-term patterns. As a result, the forecast is more affected by the local trend of residuals. If forecasting analytic 136 just performed a local trend of the samples, the deviation would still not cross the threshold set at 100% CPU usage. However, because the long-term seasonal patterns are taken into account, forecasting analytic 136 projects a bump in load just after 13:00, pushing the time-series over the threshold limit. As a result, predictive alerting analytic 138 generates an alarm or other notification.

In the above examples, the set of forecasted values was compared with an alerting threshold without any regard for confidence in the forecast. In one or more embodiments, the sensitivity of early warning may be configured based on a uncertainty interval. For example, an alarm threshold may be configured such that an alert is triggered if forecasted value indicates that resource usage is projected to exceed a threshold limit within a threshold level of confidence. In the case of CPU usage, for instance, an administrator may wish to error on the side of caution to ensure that there are sufficient resources deployed to keep up with demand. Thus, an alarm threshold may be set to trigger a notification if CPU usage is likely to reach 100% with a 25% level of confidence. On the other hand, the threshold level of confidence may be adjusted upward if the administrator would like a greater confidence before the alarm is triggered, which may also reduce the number/frequency of alerts.

The manner in which an uncertainty interval is calculated may vary from implementation to implementation. In one or more embodiments, the calculation differs for different baseline models. As an example, for the non-seasonal model, a tolerance interval may be calculated from the residuals of the regression on the samples. For seasonal models, the variance of the base line's predictive model residuals ($\sigma_b^2$) may first be calculated. Second, the variance of the residuals of the local residual regression ($\sigma_t^2$) is calculated. Third, the uncertainty interval may be generated with the assumption these variances are independent and estimate the variance of the base line plus the trend residuals to be the sum of the variances ($\sigma^2 = \sigma_b^2 + \sigma_t^2$). A tolerance interval may then be computer based on the sum of the variances. Other techniques for computing confidence intervals are described in U.S.

patent application Ser. No. 15/266,971, entitled "SEASONAL AWARE METHOD FOR FORECASTING AND CAPACITY PLANNING", previously incorporated by reference.

In addition or as an alternative to the above criteria, an alarm threshold may factor in the number of forecasted values that are projected to cross an alarm limit. For example, an alarm may be set to trigger if an only if three or more consecutive values cross an alarm limit. In this example, if only a single value is projected to cross the alarm limit, then no alarm is triggered. Thus, the alarm thresholds may be set such that temporary spikes and/or drop-offs to not trigger an alert. Rather, an alert is triggered only if the local behavior is projected to exhibit a significant deviation over a threshold period of time/sequence of values, which may be configurable and vary from implementation to implementation.

In one or more embodiments, alert criteria may include rules for suppressing alerts. For example, a rule may suppress alerts if a forecasted violation of an alerting threshold is projected to occur too soon relative to the last observed sample. This rule allows users to suppress alerts in cases where there would be insufficient time for the user to address the violation. For instance, a user may suppress alerts if the violation is less than an hour (or some other prescribed period of time) in the future. In the event that a violation is forecast less than the prescribed amount of time in the future, no alarm is generated.

As another example, an alert may be suppressed if a forecast or associated confidence interval does not violate an alerting threshold for at least a prescribed amount of time. This rule allows a user to suppress alerts when violations are considered insignificant. For instance, a user may be concerned about an SLA that is based on one hour performance intervals. If a violation is projected to lass less than an hour (or some other prescribed period of time) then the alert may be suppressed.

Figure 9:
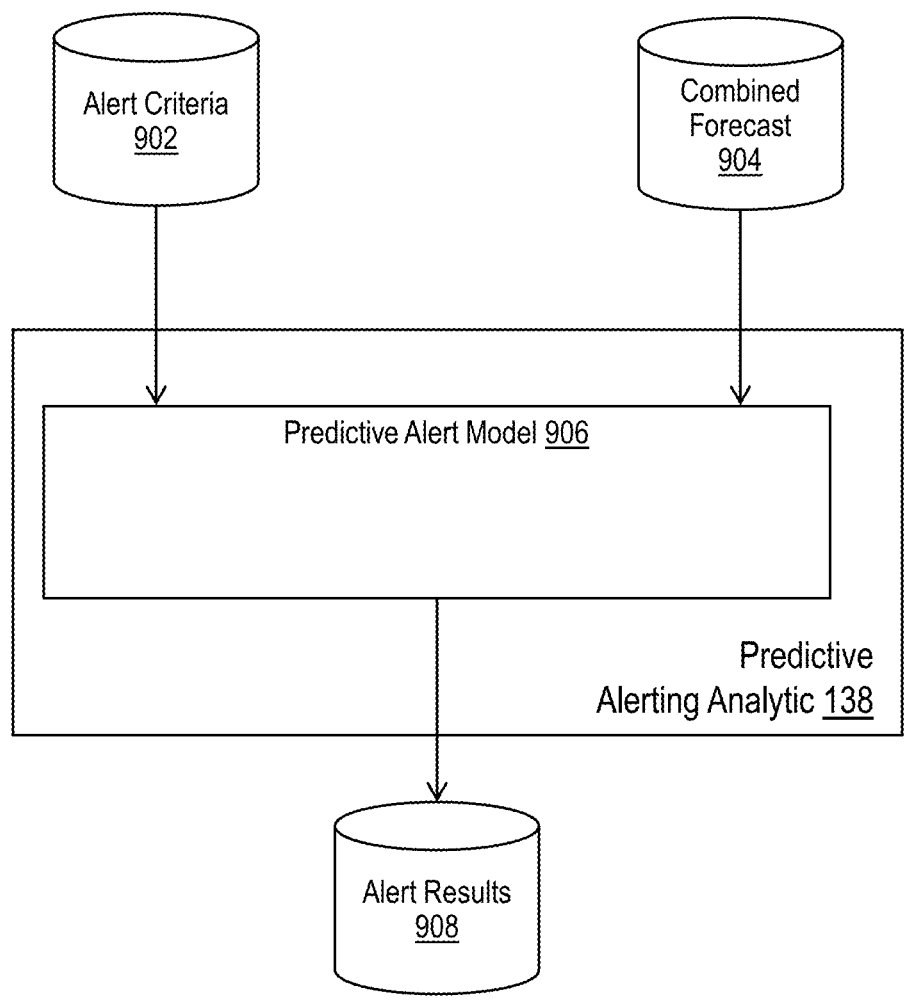
FIG. 9 illustrates an example predictive alerting analytic that generates alerts based on a set of forecasted values in accordance with one or more embodiments.

FIG. 9 illustrates an example predictive alerting analytic that generates alerts based on a set of forecasted values in accordance with one or more embodiments. Predictive alerting analytic 138 includes predictive alert model 906, for generating predictive alerts. Predictive alert model 906 receives, as input, alert criteria 902 and combined forecast 904. In one or more embodiments, combined forecast 904 defines a confidence interval for the set of forecasted values. For example, combined forecast 904 may include a set of forecast high values representing an upper bound of confidence (e.g., future value projected to fall below forecast high with 90% confidence), a forecasted value indicating the predicted value with 50% level of confidence, and a forecast low value indicating a lower bound of confidence (e.g., future value projected to be above low value with 90% confidence).

Figure 10:
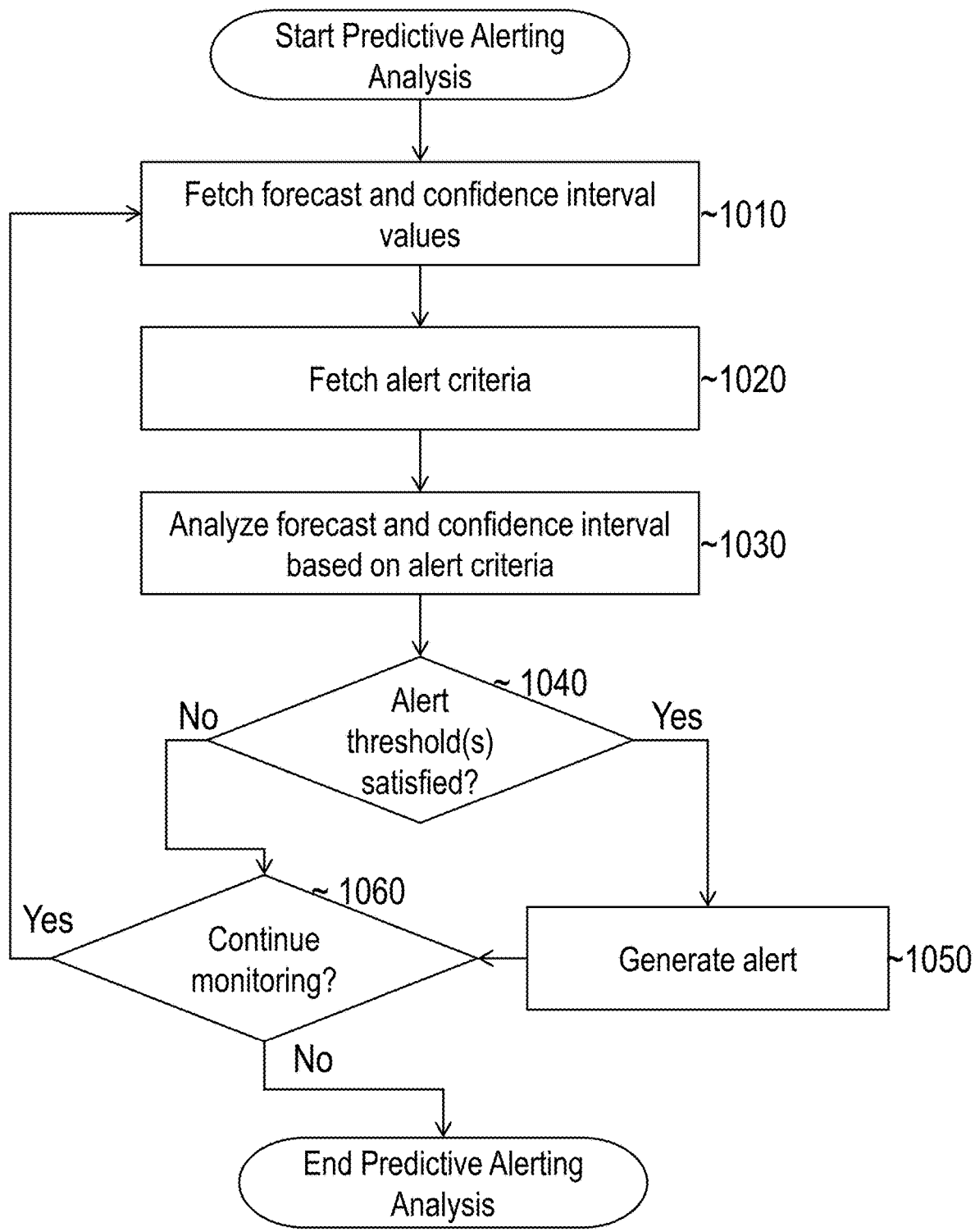
FIG. 10 illustrates an example set of operations for generating alerts based on a forecast that combines long and short term patterns in accordance with one or more embodiments.

FIG. 10 illustrates an example set of operations for generating alerts based on a forecast that combines long and short term patterns in accordance with one or more embodiments. The set of operations includes fetching the combined forecast and associated confidence interval values. For example, each forecasted value may be associated with a forecast high and a forecast low value as previously described.

The set of operations further includes fetching alert criteria (Operation 1020). The alert criteria may define one or more alerting thresholds for triggering an alarm or other notification. For example, the alert criteria may define a high and/or low limit for triggering an alarm. As another example, the alert criteria may define a threshold level of confidence and/or a threshold number of data points that cross a limit as described above.

Predictive alerting analytic 138 analyzes the forecast values and confidence interval based on the alert criteria (Operation 1030). For example, predictive alerting analytic 138 may compare the forecast high values with an alert limit to determine whether local time-series behavior is likely to cross an alarm limit within a prescribed level of confidence. As another example, predictive alerting analytic 138 may determine whether a threshold number of consecutive forecast low values will cross an alarm limit. Other thresholds and combinations of alert criteria may also be defined, depending on the particular implementation.

Based on the analysis of the forecast and confidence intervals, predictive alerting analytic 138 determines whether one or more alerting thresholds are satisfied (Operation 1040). Determining whether the one or more alert thresholds are satisfied may vary depending on the alerting criteria described above. For example, an alert threshold may be satisfied if a single forecasted value falls above an upper bound and/or below a lower bound. In other cases, an alert threshold may be satisfied only if a threshold number of forecasted values fall above the upper and/or below the lower bound. An alarm threshold may also be satisfied only if the forecast crosses an upper and/or lower bound within a prescribed level of confidence. Thus, the alert criteria provide flexibility in the manner in which alarms are triggered.

If the one or more alerting thresholds are satisfied, then an alert is generated (Operation 1050). The alert may be structured to include information identifying the cause of the alert, including, but not limited to data identifying: (a) the target or set of targets triggering the alert, (b) the alarm limit that is expected to be violated in the near future, and/or (c) a time when the alarm limit is expected to be violated. The alarm may automatically trigger a responsive action, such as deployment of additional resources, shutting down excessive resource, and/or changing target configurations. Thus, events forecasted to negatively impact system performance in the near future may be addressed before problems occur.

In one or more embodiments, predictive alerting analytic 138 determines whether to continue monitoring forecast data (Operation 1060). Predictive alerting may be enabled/disabled by a user at any time. When enabled, predictive alerting analytic 138 may continuously or periodically read new forecasted values and analyze the new values to determine whether an alert should be generated. Thus, predictive alerting analytic 138 may act as a real-time monitoring service that generates an early warning if a forecast satisfies an alarm threshold.

Figure 11:
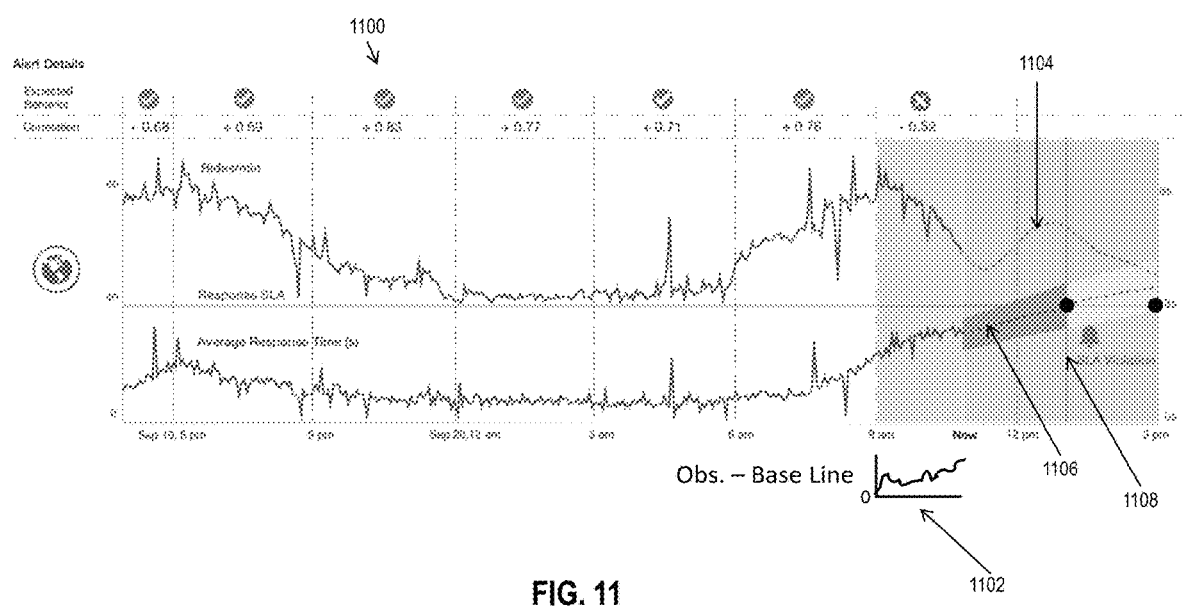
FIG. 11 illustrates an example chart of a set of forecasts where one of the forecasts triggers an alarm in accordance with one or more embodiments.

FIG. 11 illustrates an example chart of a set of forecasts where one of the forecasts triggers an alarm in accordance with one or more embodiments. Chart 1100 depicts two time-series: one that tracks the average rides per minute and another that tracks the average response time for a ride sharing service. Chart 1100 displays the expected behavior and correlation of the observed behavior against baseline 1102 for multiple windows of time. A checkmark is displayed where the correlation of the observed behavior falls within a threshold of the expected behavior and an "X" is displayed when the correlation is below a threshold.

Plot 1104 shows a combined forecast for the rides per minute time-series. In this case, the time-series is following an expected pattern and the forecast is substantially a function of the baseline and long-term trend.

Plot 1106 shows a combined forecast for the average response time time-series. In this case, the time-series is deviating from an expected pattern. The forecast is thus a function of the baseline, long-term trend, and local trend of residuals. As illustrated, the average response time time-series is projected to violate a response service license agreement (SLA) threshold at time 1108. As a result, an alarm is generated to notify a user that the SLA is projected to be violated.

Figure 12:
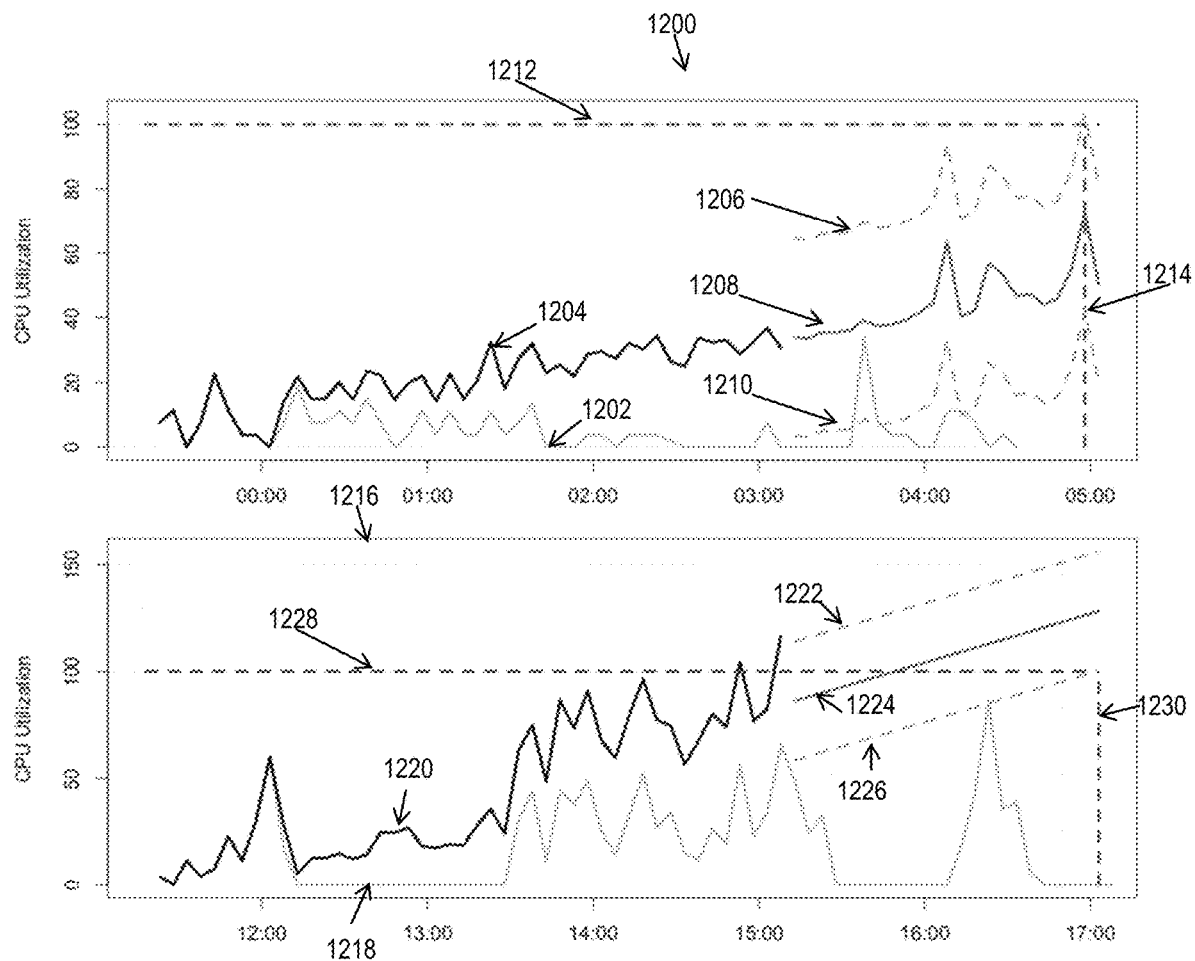
FIG. 12 illustrates an example chart of a set of forecasts that trigger alerts in accordance with one or more embodiments.

As previously indicated, the sensitivity of an early warning can be configured based on confidence. FIG. 12 illustrates an example chart of a set of forecasts that trigger alerts based on different threshold levels of confidence in accordance with one or more embodiments. Chart 1200 depicts baseline 1202 and observed values 1204 for CPU utilization. Combined forecast 1208 is generated with forecast high 1206 and forecast low 1210 indicating a 90% confidence interval. Alarm threshold 1212 is configured to trigger a notification if there is a 5% probability of a threshold exceedance in the next two hours. In other words, a notification is triggered when the upper bound (forecast high 1206) of a 90% tolerance interval crosses the limit. Thus, an alarm is triggered projecting that forecast high 1206 will cross the limit at time 1214.

Chart 1216 depicts an alarm limit that triggers based on a different threshold level of confidence. Chart 1216 plots baseline 1218 and observed values 1220 for CPU utilization. Combined forecast 1224 is generated with forecast high 1222 and forecast low 1226 indicating a 95% confidence interval. Alarm threshold 1228 is configured to trigger a notification if there is a 97.5% chance that the time-series will be above the limit in the next two hours. In this case, the notification is triggered when the lower limit (forecast low 1226) crosses the limit.

7. Micro Service-Based Alerting

According to one or more embodiments, the techniques described herein are implemented in a microservice architecture. A microservice in this context refers to software logic designed to be independently deployable, having endpoints that may be logically coupled to other microservices to build a variety of applications. Applications built using microservices are distinct from monolithic applications, which are designed as a single fixed unit and generally comprise a single logical executable. With microservice applications, different microservices are independently deployable as separate executables. Microservices may communicate using HyperText Transfer Protocol (HTTP) messages and/or according to other communication protocols via API endpoints. Microservices may be managed and updated separately, written in different languages, and be executed independently from other microservices.

Microservices provide flexibility in managing and building applications. Different applications may be built by connecting different sets of microservices without changing the source code of the microservices. Thus, the microservices act as logical building blocks that may be arranged in a variety of ways to build different applications. Microservices may provide monitoring services that notify a microservices manager (such as If-This-Then-That (IFTTT), Zapier, or Oracle Self-Service Automation (OSSA)) when trigger events from a set of trigger events exposed to the microservices manager occur. Microservices exposed for an application may alternatively or additionally provide action services that perform an action in the application (controllable and configurable via the microservices manager by passing in values, connecting the actions to other triggers and/or data passed along from other actions in the microservices manager) based on data received from the microservices manager. The microservice triggers and/or actions may be chained together to form recipes of actions that occur in optionally different applications that are otherwise unaware of or have no control or dependency on each other. These managed applications may be authenticated or plugged in to the microservices manager, for example, with user-supplied application credentials to the manager, without requiring reauthentication each time the managed application is used alone or in combination with other applications.

In one or more embodiments, microservices may be connected via a GUI. For example, microservices may be displayed as logical blocks within a window, frame, other element of a GUI. A user may drag and drop microservices into an area of the GUI used to build an application. The user may connect the output of one microservice into the input of another microservice using directed arrows or any other GUI element. The application builder may run verification tests to confirm that the output and inputs are compatible (e.g., by checking the datatypes, size restrictions, etc.)

Triggers

The predictive alerting described above may be encapsulated into a microservice, according to one or more embodiments. In other words, a microservice that triggers a notification (into the microservices manager for optional use by other plugged in applications, herein referred to as the "target" microservice) based on a combined forecast may be represented as a GUI block and connected to one or more other microservices. The trigger condition may include absolute or relative thresholds for values, and/or absolute or relative thresholds for the amount or duration of data to analyze, such that the trigger to the microservices manager occurs whenever a plugged-in seasonality application detects that a threshold is crossed. For example, a user may request a trigger into the microservices manager when the seasonality application detects a combined forecast (seasonal-based and trend-based) above 90% CPU usage within the next hour.

In one embodiment, the trigger, when satisfied, might output time-series data for consumption by the target microservice. In another embodiment, the trigger, when satisfied, outputs a binary value indicating the trigger has been satisfied, or outputs the name of the field (for example, "West Server CPU Usage") or other context information for which the trigger condition was satisfied. Additionally or alternatively, the target microservice may be connected to one or more other microservices such that the alert is input to the other microservices. Other microservices may perform responsive actions based on the predictive alert, including, but not limited to, deploying additional resources, adjusting system configurations, and/or generating GUIs.

Actions

In the same or a different embodiment, a plugged-in seasonality application may expose actions to the microservices manager. The exposed actions may receive, as input, data or an identification of a data object or location of data, that causes data to be moved into a data cloud. The data cloud may be a seasonality cloud, which automatically analyzes data for the detection and characterization of seasons. In another embodiment, the exposed actions may receive, as input, a request to increase or decrease existing alert thresholds. The input might identify existing in-application alert thresholds and whether to increase or decrease, or delete the threshold. In another embodiment, the input might request the seasonality application to create new in-application alert thresholds. The in-application alerts may trigger alerts to the user while logged into the application, or may trigger alerts to the user using default or user-selected alert mechanisms available within the seasonality application itself, rather than through other applications plugged into the microservices manager. In yet another embodiment, the seasonality application may generate and provide a forecast based on input that identifies, locates, or provides historical data to forecast, and defines the extent or scope of the requested forecast (e.g., 3 hours out for the West Server CPU Usage dataset stored in the data cloud). The action, when triggered, causes the seasonality application to provide, store, or display the forecast, for example, as a data model or as aggregate data that describes a data model.

8. Predictive Alerting Cloud Service

The predictive alerting techniques described herein are implemented using one or more processing solutions, examples of which include distributed systems, clustered computing systems, and cloud computing systems. In an embodiment, one or more logic blocks described above are part of a cloud computing system. A cloud computing system implements one or more of: cloud storage, cloud processing, cloud communication, and any other kind of cloud computing service. Further, cloud computing systems may operate under a pay-for-what-you-use-as-you-use-it model, under a fixed subscription model, under a software-as-a-service (SaaS) model, etc. In a cloud-based environment, any part (or the whole of) the functionality described above may be controllable via an interface that is exposed at a cloud computing system.

9. Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 13:
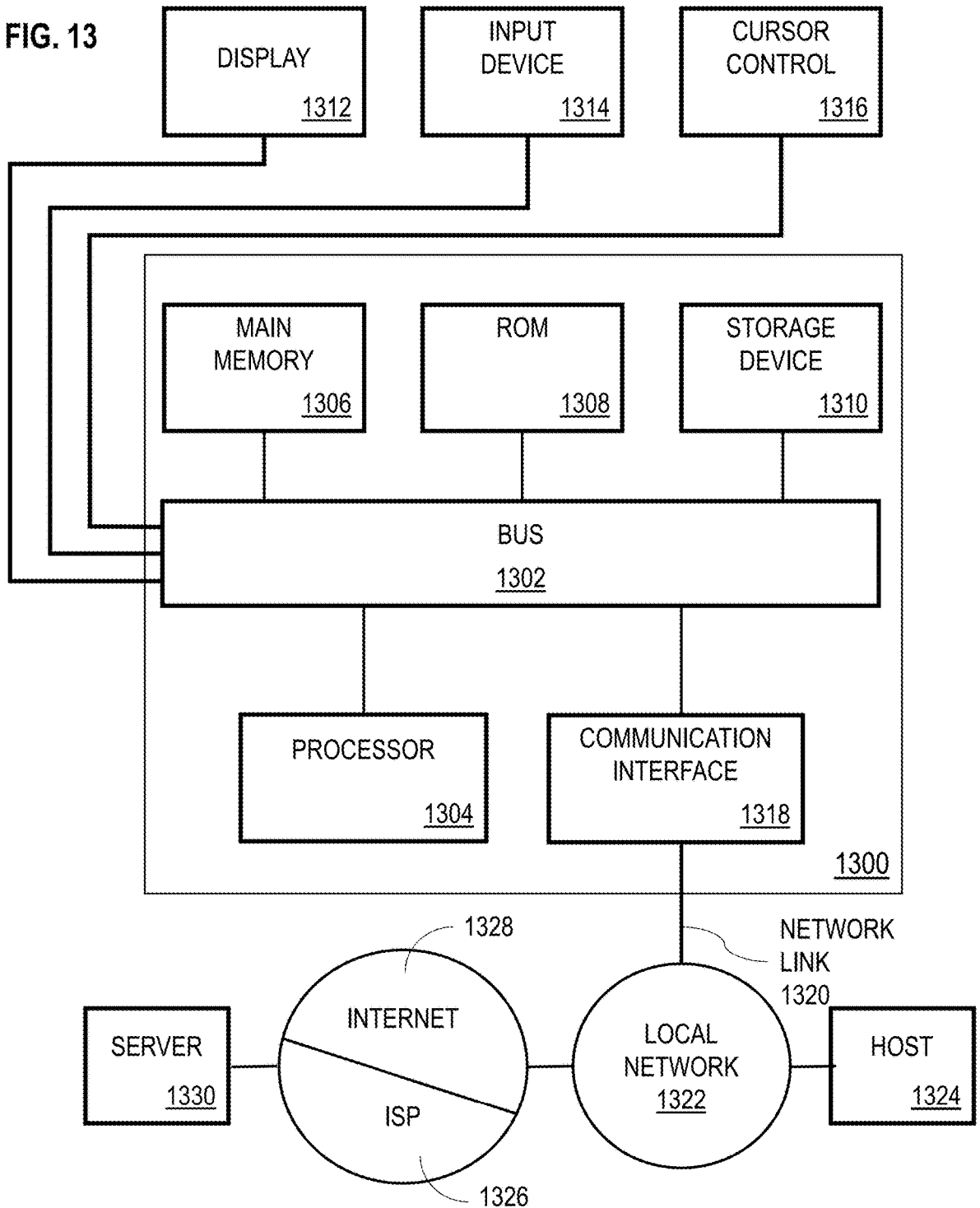
FIG. 13 illustrates an example computer system upon which one or more embodiments may be implemented.

For example, FIG. 13 is a block diagram that illustrates computer system 1300 upon which one or more embodiments may be implemented. Computer system 1300 includes bus 1302 or other communication mechanism for communicating information, and hardware processor 1304 coupled with bus 1302 for processing information. Hardware processor 1304 may be, for example, a general purpose microprocessor.

Computer system 1300 also includes main memory 1306, such as a random access memory (RAM) or other dynamic storage device, coupled to bus 1302 for storing information and instructions to be executed by processor 1304. Main memory 1306 also may be used for storing temporary variables or other intermediate information during execution of instructions to be executed by processor 1304. Such instructions, when stored in non-transitory storage media accessible to processor 1304, render computer system 1300 into a special-purpose machine that is customized to perform the operations specified in the instructions.

Computer system 1300 further includes read only memory (ROM) 1308 or other static storage device coupled to bus 1302 for storing static information and instructions for processor 1304. Storage device 1310, such as a magnetic disk or optical disk, is provided and coupled to bus 1302 for storing information and instructions.

Computer system 1300 may be coupled via bus 1302 to display 1312, such as a cathode ray tube (CRT), liquid crystal display (LCD), or light-emitting diode (LED), for displaying information to a computer user. Input device 1314, which may include physical and/or touchscreen based alphanumeric keys, is coupled to bus 1302 for communicating information and command selections to processor 1304. Another type of user input device is cursor control 1316, such as a mouse, a trackball, or cursor direction keys for communicating direction information and command selections to processor 1304 and for controlling cursor movement on display 1312. This input device typically has two degrees of freedom in two axes, a first axis (e.g., x) and a second axis (e.g., y), that allows the device to specify positions in a plane.

Computer system 1300 may implement the techniques described herein using customized hard-wired logic, one or more ASICs or FPGAs, firmware and/or program logic which in combination with the computer system causes or programs computer system 1300 to be a special-purpose machine. According to one embodiment, the techniques herein are performed by computer system 1300 in response to processor 1304 executing one or more sequences of one or more instructions contained in main memory 1306. Such instructions may be read into main memory 1306 from another storage medium, such as storage device 1310. Execution of the sequences of instructions contained in main memory 1306 causes processor 1304 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 1310. Volatile media includes dynamic memory, such as main memory 1306. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 1302. Transmission media can also take the form of acoustic or light waves, such as those generated during radio-wave and infra-red data communications.

Various forms of media may be involved in carrying one or more sequences of one or more instructions to processor 1304 for execution. For example, the instructions may initially be carried on a magnetic disk or solid state drive of a remote computer. The remote computer can load the instructions into its dynamic memory and send the instructions over a telephone line using a modem. A modem local to computer system 1300 can receive the data on the telephone line and use an infra-red transmitter to convert the data to an infra-red signal. An infra-red detector can receive the data carried in the infra-red signal and appropriate circuitry can place the data on bus 1302. Bus 1302 carries the data to main memory 1306, from which processor 1304 retrieves and executes the instructions. The instructions received by main memory 1306 may optionally be stored on storage device 1310 either before or after execution by processor 1304.

Computer system 1300 also includes a communication interface 1318 coupled to bus 1302. Communication interface 1318 provides a two-way data communication coupling to a network link 1320 that is connected to local network 1322. For example, communication interface 1318 may be an integrated services digital network (ISDN) card, cable modem, satellite modem, or a modem to provide a data communication connection to a corresponding type of telephone line. As another example, communication interface 1318 may be a local area network (LAN) card to provide a data communication connection to a compatible LAN. Wireless links may also be implemented. In any such implementation, communication interface 1318 sends and receives electrical, electromagnetic or optical signals that carry digital data streams representing various types of information.

Network link 1320 typically provides data communication through one or more networks to other data devices. For example, network link 1320 may provide a connection through local network 1322 to host computer 1324 or to data equipment operated by Internet Service Provider (ISP) 1326. ISP 1326 in turn provides data communication services through the world wide packet data communication network now commonly referred to as the "Internet" 1328. Local network 1322 and Internet 1328 both use electrical, electromagnetic or optical signals that carry digital data streams. The signals through the various networks and the signals on network link 1320 and through communication interface 1318, which carry the digital data to and from computer system 1300, are example forms of transmission media.

Computer system 1300 can send messages and receive data, including program code, through the network(s), network link 1320 and communication interface 1318. In the Internet example, server 1330 might transmit a requested code for an application program through Internet 1328, ISP 1326, local network 1322 and communication interface 1318.

The received code may be executed by processor 1304 as it is received, and/or stored in storage device 1310, or other non-volatile storage for later execution.

10. Miscellaneous; Extensions

Embodiments are directed to a system with one or more devices that include a hardware processor and that are configured to perform any of the operations described herein and/or recited in any of the claims below.

In an embodiment, a non-transitory computer readable storage medium comprises instructions which, when executed by one or more hardware processors, causes performance of any of the operations described herein and/or recited in any of the claims.

Any combination of the features and functionalities described herein may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the invention, and what is intended by the applicants to be the scope of the invention, is the literal and equivalent scope of the set of claims that issue from this application, in the specific form in which such claims issue, including any subsequent correction.

What is claimed is:

1. A method comprising:
   generating a first model representing one or more patterns within a first set of time-series data, the first set of time-series data comprising data points from a first range of time, the one or more patterns periodically recurring within the first range of time;
   generating a second model representing one or more trending patterns within a second set of time-series data, the second set of time-series data comprising data points from a second range of time that is different than the first range of time, the first set of time-series data including a plurality of data points that are older than any data point in the second set of time-series data;
   generating, within at least one of volatile or non-volatile storage, a set of forecasted values based on the first model and the second model;
   configuring a set of one or more alerting thresholds based on a level of confidence in the set of forecasted values;
   based on the set of forecasted values and the level of confidence in the set of forecasted values, determining whether the set of one or more alerting thresholds has been satisfied; and
   responsive to determining that the set of one or more alerting thresholds has been satisfied, generating an alert associated with the set of forecasted values.

2. The method of claim 1, wherein the one or more patterns represented by the first model comprise a periodic trend; wherein the one or more trending patterns comprises a local trend; wherein the periodic trend is different than the local trend; and wherein the periodic trend comprises a trend over multiple iterations of a particular period and the local trend comprises a trend over consecutive data points.

3. The method of claim 2, wherein the trend over consecutive data points occurs within a single instance of the particular period.

4. The method of claim 1, wherein generating the second model comprises determining a set of residuals based on the second set of time-series data and the first model; determining a trend from the set of residuals; wherein in the one or more trending patterns comprises the trend from the set of residuals.

5. The method of claim 4, further comprising buffering the set of residuals in a cache; wherein the amount of residuals buffered in the cache is a function of a forecast horizon for the set of forecasted values.

6. The method of claim 1, wherein the first model identifies a confidence interval and wherein determining whether the set of one or more alerting thresholds has been satisfied is performed based at least in part on whether at least one forecasted value falls outside the confidence interval.

7. The method of claim 1, wherein the first model identifies a confidence interval and wherein determining whether the set of one or more alerting thresholds has been satisfied is performed based at least in part on whether a set of forecasted values falls outside the confidence interval for longer than a prescribed amount of time determined based at least in part on user input.

8. The method of claim 1, wherein the alert associated with the set of forecasted values indicates that resource usage is projected to exceed a threshold within a threshold level of confidence.

9. The method of claim 1, further comprising performing at least one of deploying additional resources or changing a resource configuration responsive to the alert.

10. One or more non-transitory computer-readable media storing instructions, which, when executed by one or more hardware processors, cause operations comprising:
generating a first model representing one or more patterns within a first set of time-series data, the first set of time-series data comprising data points from a first range of time, the one or more patterns periodically recurring within the first range of time;
generating a second model representing one or more trending patterns within a second set of time-series data, the second set of time-series data comprising data points from a second range of time that is different than the first range of time, the first set of time-series data including a plurality of data points that are older than any data point in the second set of time-series data;
generating, within at least one of volatile or non-volatile storage, a set of forecasted values based on the first model and the second model;
configuring a set of one or more alerting thresholds based on a level of confidence in the set of forecasted values;
based on the set of forecasted values and the level of confidence in the set of forecasted values, determining whether the set of one or more alerting thresholds has been satisfied; and
responsive to determining that the set of one or more alerting thresholds has been satisfied, generating an alert associated with the set of forecasted values.

11. The one or more non-transitory computer-readable media of claim 10, wherein the one or more patterns represented by the first model comprise a periodic trend; wherein the one or more trending patterns comprises a local trend; wherein the periodic trend is different than the local trend; and wherein the periodic trend comprises a trend over multiple iterations of a particular period and the local trend comprises a trend over consecutive data points.

12. The one or more non-transitory computer-readable media of claim 11, wherein the trend over consecutive data points occurs within a single instance of the particular period.

13. The one or more non-transitory computer-readable media of claim 10, wherein generating the second model comprises determining a set of residuals based on the second set of time-series data and the first model; determining a trend from the set of residuals; wherein in the one or more trending patterns comprises the trend from the set of residuals.

14. The one or more non-transitory computer-readable media of claim 13, the operations further comprising buffering the set of residuals in a cache; wherein the amount of residuals buffered in the cache is a function of a forecast horizon for the set of forecasted values.

15. The one or more non-transitory computer-readable media of claim 10, wherein the first model identifies a confidence interval and wherein determining whether the set of one or more alerting thresholds has been satisfied is performed based at least in part on whether at least one forecasted value falls outside the confidence interval.

16. The one or more non-transitory computer-readable media of claim 10, wherein the first model identifies a confidence interval and wherein determining whether the set of one or more alerting thresholds has been satisfied is performed based at least in part on whether a set of forecasted values falls outside the confidence interval for longer than a prescribed amount of time determined based at least in part on user input.

17. The one or more non-transitory computer-readable media of claim 10, wherein the alert associated with the set of forecasted values indicates that resource usage is projected to exceed a threshold within a threshold level of confidence.

18. The one or more non-transitory computer-readable media of claim 10, the operations further comprising performing at least one of deploying additional resources or changing a resource configuration responsive to the alert.

19. A system comprising:
one or more hardware processors;
one or more non-transitory computer-readable media storing instructions which, when executed by the one or more hardware processors, cause:
generating a first model representing one or more patterns within a first set of time-series data, the first set of time-series data comprising data points from a first range of time, the one or more patterns periodically recurring within the first range of time;
generating a second model representing one or more trending patterns within a second set of time-series data, the second set of time-series data comprising data points from a second range of time that is different than the first range of time, the first set of time-series data including a plurality of data points that are older than any data point in the second set of time-series data;
generating, within at least one of volatile or non-volatile storage, a set of forecasted values based on the first model and the second model;
configuring a set of one or more alerting thresholds based on a level of confidence in the set of forecasted values;
based on the set of forecasted values and the level of confidence in the set of forecasted values, determining whether the set of one or more alerting thresholds has been satisfied; and
responsive to determining that the set of one or more alerting thresholds has been satisfied, generating an alert associated with the set of forecasted values.

* * * * *